(12) United States Patent
Bertrand et al.

(10) Patent No.: US 12,176,498 B2
(45) Date of Patent: Dec. 24, 2024

(54) SWITCH ACTIVATED BATTERY SWELL DETECTION

(71) Applicant: Cirque Corporation, Sandy, UT (US)

(72) Inventors: Jon Bertrand, Taylorsville, UT (US); Brian Monson, Farmington, UT (US)

(73) Assignee: Cirque Corporation, Sandy, UT (US)

( * ) Notice: Subject to any disclaimer, the term of this patent is extended or adjusted under 35 U.S.C. 154(b) by 542 days.

(21) Appl. No.: 17/528,528

(22) Filed: Nov. 17, 2021

(65) Prior Publication Data

US 2023/0155190 A1 May 18, 2023

(51) Int. Cl.
*H01M 10/48* (2006.01)

(52) U.S. Cl.
CPC ........ *H01M 10/48* (2013.01); *H01M 2220/30* (2013.01)

(58) Field of Classification Search
CPC ...... H01M 10/40; H01M 10/45; H01M 10/48; H01M 50/30; H01M 50/20
See application file for complete search history.

(56) References Cited

U.S. PATENT DOCUMENTS

| | | | |
|---|---|---|---|
| 3,656,340 A | 4/1972 | Ball | |
| 7,545,119 B1* | 6/2009 | Egan | H02J 7/00308 320/136 |
| 8,691,408 B2 | 4/2014 | Hong | |
| 8,717,186 B2 | 5/2014 | Zhou | |
| 9,442,594 B2 | 9/2016 | Graham | |
| 9,608,297 B2 | 3/2017 | Van Lammeren | |
| 9,673,644 B2 | 6/2017 | Park | |
| 10,122,050 B2 | 11/2018 | Fukuda | |
| 10,158,149 B2 | 12/2018 | Albert | |
| 10,312,555 B2 | 6/2019 | Fukuda | |
| 10,522,814 B2 | 12/2019 | Lee | |
| 2009/0274958 A1 | 11/2009 | Fukumine | |
| 2010/0247980 A1 | 9/2010 | Jang | |
| 2012/0208054 A1 | 8/2012 | Shirasawa | |
| 2013/0093383 A1 | 4/2013 | Kim | |
| 2014/0002269 A1 | 1/2014 | Zhou | |
| 2014/0042961 A1 | 2/2014 | Lan | |
| 2014/0062418 A1 | 3/2014 | Lim | |
| 2015/0137767 A1 | 5/2015 | Kim | |
| 2015/0180016 A1 | 6/2015 | Choi | |
| 2015/0311571 A1 | 10/2015 | Krauss | |
| 2015/0380778 A1 | 12/2015 | Kim | |
| 2016/0064780 A1 | 3/2016 | Jarvis | |
| 2016/0116548 A1 | 4/2016 | Ghantous | |
| 2016/0149270 A1* | 5/2016 | Albert | H01M 10/488 429/50 |
| 2016/0172715 A1* | 6/2016 | Ju | H01M 50/271 429/159 |
| 2016/0268644 A1 | 9/2016 | Lee | |
| 2017/0077717 A1 | 3/2017 | Lundgren | |
| 2017/0331157 A1 | 11/2017 | Newman | |
| 2018/0006342 A1* | 1/2018 | Lee | H01M 10/488 |
| 2018/0149462 A1 | 5/2018 | Ghantous | |
| 2018/0261824 A1 | 9/2018 | Ju | |
| 2021/0093950 A1* | 4/2021 | Duncan | G05G 9/047 |

* cited by examiner

*Primary Examiner* — Kenneth J Douyette

(57) ABSTRACT

A portable electronic device may include a battery assembly, a battery swell detection unit in proximity to the battery assembly, the battery swell detection unit includes a circuit, a switch positioned to be moved by swelling of a battery cell, a processor, and memory having programmed instructions that cause the processor, when executed, to detect battery swelling based on a position of the switch.

13 Claims, 21 Drawing Sheets

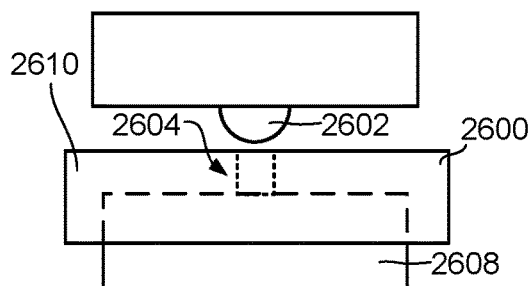
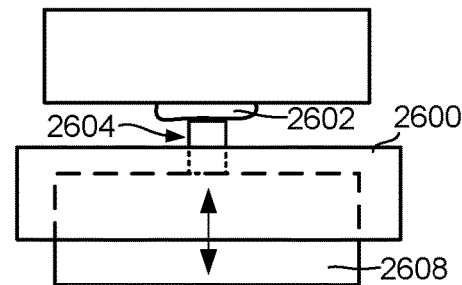
Fig. 26A          Fig. 26B
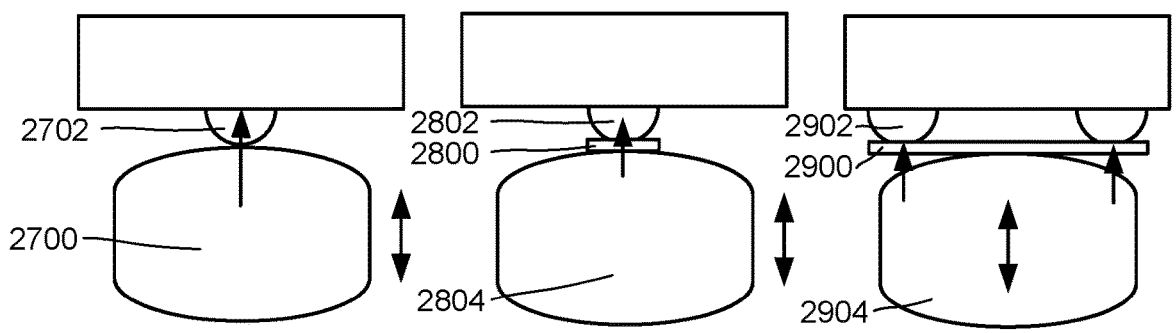
Fig. 27     Fig. 28     Fig. 29

SWITCH ACTIVATED BATTERY SWELL DETECTION

RELATED APPLICATIONS

The present Application is a continuation-in-part of U.S. patent Ser. No. 17/356,019 by Jon Bertrand et al., filed on Jun. 23, 2021 and titled "Battery Swell Detection with an Electrically Conductive Dome" assigned to the assignee hereof. This reference is herein incorporated by reference for all that it discloses.

FIELD OF THE DISCLOSURE

This disclosure relates generally to systems and methods for detecting changes in a size or shape of a battery assembly. In particular, this disclosure relates to systems and methods for sensing dimensional changes in a battery cell within a battery assembly.

BACKGROUND

A change in a battery size, shape, or other dimension may indicate that a part of the battery cell is nearing failure or may indicate the presence of a dangerous situation. Lithium-ion (Li-ion) batteries are often used in numerous consumer, military, and aerospace electronic goods such as laptops, cellular phones, satellites, spacecraft, and the like. Li-ion batteries can present safety hazards because they contain a flammable electrolyte (typically a Li salt) and may need to be kept pressurized. Li-ion batteries can swell as they age and degrade.

A swollen battery cell is a potentially dangerous problem in devices that have a restricted space constraint. Traditionally, laptops, for example, enclosed batteries in rigid plastic or metal cases that confined any swelling and prevented it from pushing into other parts of the laptop. Typical battery assemblies may include a few individual battery cells. Presently, as laptops have become thinner and lighter, individual battery cells are often encapsulated in a vacuum sealed plastic pouch or bag, and if the battery cell swells the battery pack pushes on components around it. This typically means it pushes on the keyboard and/or the touch pad. Forces from a swollen battery can be quite large and can cause mechanical damage. Other drawbacks, disadvantages, and inconveniences of present systems and methods also exist.

An example of a battery detection system is disclosed in U.S. Patent Publication No. 2014/0042961 issued to Chi-Ming Lan. This reference discloses an electronic device and a method for detecting the swelling of a battery. The electronic device includes a battery module, a swelling detection module, and a system. The battery module includes at least one battery therein. The deformation module is deposed within the battery module and is configured to detect the swelling of the battery thereby generating a signal. The system is configured to receive the signal directly transmitted from the deformation module, and to determine whether the signal is greater than a first setting value or less than a second setting value, such that when the signal is greater than the first setting value or less than the second setting value, the system activates a protection mechanism to prevent the battery from further swelling.

Another example of a battery detection system is disclosed in U.S. Pat. No. 8,691,408 issued to Eui-Sun Hong, et al. This reference discloses a secondary battery that includes a case having positive and negative electrodes, a safety device attached to a surface of the case and having a resistance value which changes during swelling of the case, and a protective circuit module attached to a side of the case while being electrically connected to the safety device. The resistance value of the safety device changes as the case swells, and the protective circuit module reduces or interrupts charging/discharging currents in response thereto. The safety device can be used for all secondary batteries regardless of capacity, can quickly react against abruptly rising internal temperature and rapid swelling, and can stably prevent swelling which occurs above an allowable temperature. Both of these references are herein incorporated by reference for all that they teach.

SUMMARY

In some embodiments, a portable electronic device may include a battery assembly, a battery swell detection unit in proximity to the battery assembly, the battery swell detection unit includes a circuit, a switch positioned to be moved by swelling of a battery cell, a processor, and memory having programmed instructions that cause the processor, when executed, to detect battery swelling based on a position of the switch.

Swelling of the battery cell may cause the switch to move to complete the circuit.

Swelling of the battery cell ca may cause uses the switch to move to open the circuit.

The switch may be a membrane switch.

The switch may be a dome switch.

The switch may be a conductive pill switch.

The portable electronic device may include a touch sensor. The touch sensor may include a touch surface integrated onto an input surface of the portable electronic device, a printed circuit board located between the input surface and the battery assembly, and the printed circuit board including a touch side facing towards the touch surface and a battery side facing towards the battery assembly. The switch may be connected to the battery side of the printed circuit board.

The circuit and switch may be incorporated into a casing surrounding the battery cell of the battery assembly.

The switch may be configured to move with a casing surrounding the battery cell of the battery assembly.

The switch may be positioned on an underside of the battery assembly.

The switch may be positioned on a side of the battery assembly.

In one embodiment, a method detecting battery swelling may include detecting a position of a switch that is indicative of swelling of a battery cell disposed in a portable electronic device.

Detecting the position of a switch may include measuring an electric current amount that is greater than zero from a swell detection circuit.

Swelling of the battery cell may cause the switch to move to complete a circuit that, when compete, is indicative of battery swelling.

Swelling of the battery cell may cause the switch to move to open a circuit that, when open, is indicative of battery swelling.

The switch may be a membrane switch.

The switch may be a conductive pill switch.

In one embodiment, a computer-program product for use in a portable electronic device may include a non-transitory computer-readable medium storing instructions executable by a processor to detect a position of a switch that is indicative of swelling of a battery cell disposed in a portable electronic device.

The instructions may cause the processor to measure an electric current amount that is greater than zero from a swell detection circuit.

The instructions may cause the processor to detect completion of a circuit that, when compete, is indicative of battery swelling.

BRIEF DESCRIPTION OF THE DRAWINGS

FIG. 26A depicts an example of a battery assembly and a battery swell detection unit in accordance with this disclosure.

FIG. 26B depicts an example of a battery assembly and a battery swell detection unit in accordance with this disclosure.

FIG. 27 depicts an example of a battery assembly and a battery swell detection unit in accordance with this disclosure.

FIG. 28 depicts an example of a battery assembly and a battery swell detection unit in accordance with this disclosure.

FIG. 29 depicts an example of a battery assembly and a battery swell detection unit in accordance with this disclosure.

Figure 1:
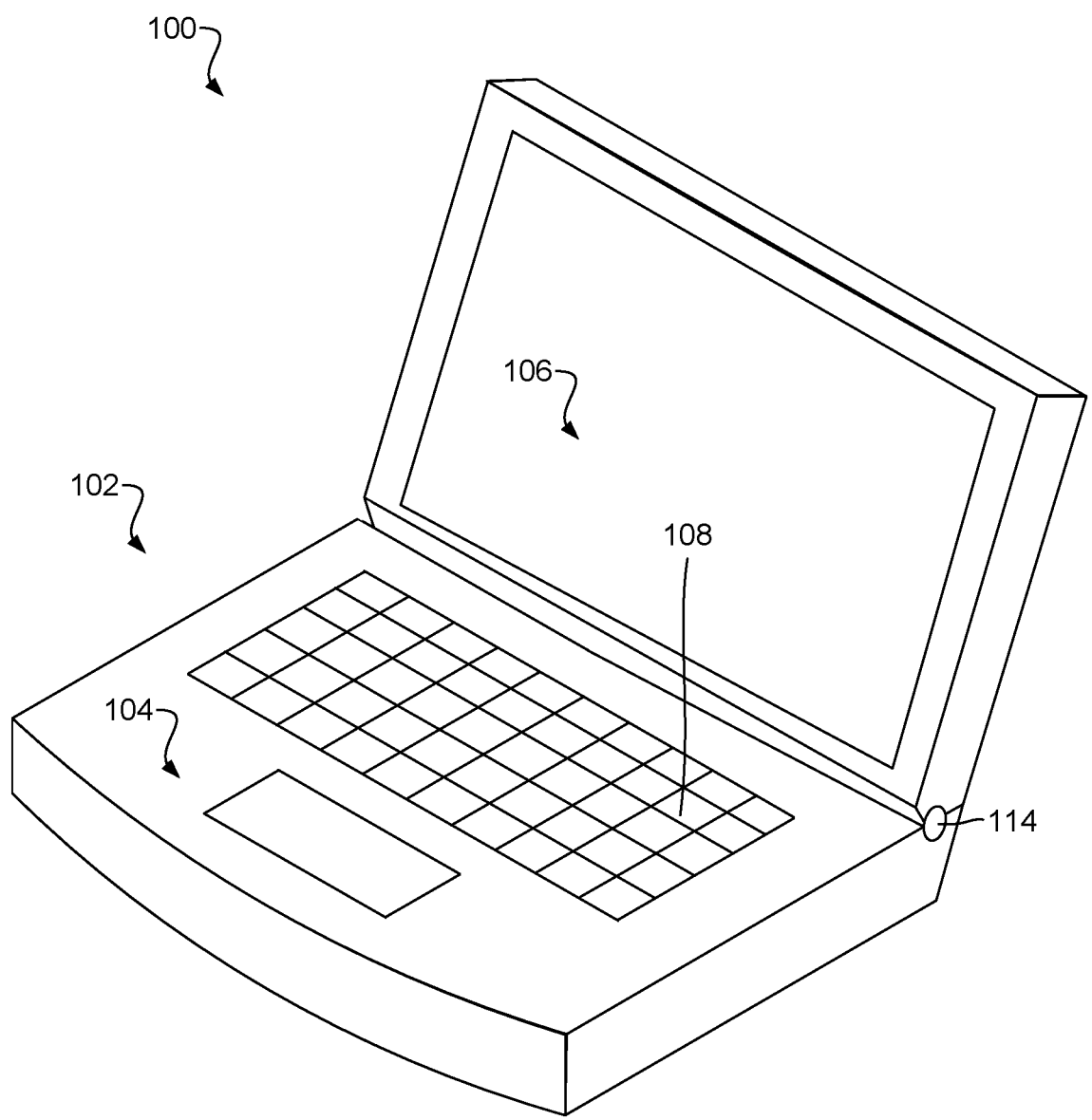
FIG. 1 depicts an example of a portable electronic device in accordance with this disclosure.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION OF THE INVENTION

This description provides examples, and is not intended to limit the scope, applicability or configuration of the invention. Rather, the ensuing description will provide those skilled in the art with an enabling description for implementing embodiments of the invention. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted, or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

For purposes of this disclosure, the term "aligned" generally refers to being parallel, substantially parallel, or forming an angle of less than 35.0 degrees. For purposes of this disclosure, the term "transverse" generally refers to perpendicular, substantially perpendicular, or forming an angle between 55.0 and 125.0 degrees. For purposes of this disclosure, the term "length" generally refers to the longest dimension of an object. For purposes of this disclosure, the term "width" generally refers to the dimension of an object from side to side and may refer to measuring across an object perpendicular to the object's length.

For purposes of this disclosure, the term "electrode" may generally refer to a portion of an electrical conductor intended to be used to make a measurement, and the terms "route" and "trace" generally refer to portions of an electrical conductor that are not intended to make a measurement. For purposes of this disclosure in reference to circuits, the term "line" generally refers to the combination of an electrode and a "route" or "trace" portions of the electrical conductor. For purposes of this disclosure, the term "Tx" generally refers to a transmit line, electrode, or portions thereof, and the term "Rx" generally refers to a sense line, electrode, or portions thereof.

For the purposes of this disclosure, the term "portable electronic device" may generally refer to devices that can be transported and include a battery and electronic components. Examples may include an electric vehicle, a hybrid vehicle, a laptop, a desktop, a mobile phone, an electronic tablet, a personal digital device, a watch, a gaming controller, a wearable device, another type of device, or combinations thereof. As an example, a material that is in direct physical contact with an object may touch the object. On the other hand, a material that is in indirect physical contact with the object may include being in direct physical contact with an intervening material (or intervening materials) that is in direct physical contact with the object.

It should be understood that use of the terms "touch pad" and "touch sensor" throughout this document may be used interchangeably with "capacitive touch sensor," "capacitive sensor," "capacitive touch and proximity sensor," "proximity sensor," "touch and proximity sensor," "touch panel," "trackpad", "touch pad," and "touch screen."

It should also be understood that, as used herein, the terms "vertical," "horizontal," "lateral," "upper," "lower," "left," "right," "inner," "outer," etc., can refer to relative directions or positions of features in the disclosed devices and/or assemblies shown in the Figures. For example, "upper" or "uppermost" can refer to a feature positioned closer to the top of a page than another feature. These terms, however, should be construed broadly to include devices and/or assemblies having other orientations, such as inverted or inclined orientations where top/bottom, over/under, above/below, up/down, and left/right can be interchanged depending on the orientation.

While many of the examples below are depicted with reference to a battery size detection system, the system may be applied to detect size changes in any type of objects. For example, the size detection system may be used to detect the size changes of solids, gases, liquids, combinations thereof, or complex devices, such as battery assemblies. A non-exhaustive list of battery types that may be used, include, but are not limited to, lithium batteries, lithium sulphur batteries, alkaline batteries, solid state batteries, graphite based batteries, magnesium based batteries, fluoride based batteries, sodium based batteries, or other types of batteries, or combinations thereof.

For the purposes of this disclosure, the term "battery cell" may generally refer to cells in a battery assembly where chemical reactions occur. For example, these chemical reactions may create a flow of electrons. A battery cell may include an anode, a cathode, and an electrolyte. In some examples, when an anode and a cathode of a battery cell are connected to a circuit, a chemical reaction causes electrons to flow into the circuit. In some examples, the battery cells may be individually compartmentalized and be stackable within a rigid casing of a battery assembly. For example, the battery cells may be stacked in a manner so that the anode of a first battery cell contacts the cathode of an adjacent battery cell. This may allow the multiple battery cells to collectively provide a flow of electrons into a circuit. In some cases, each of the battery cells of a battery assembly have a cylindrical shape. In other examples, the shape of the battery cells is prismatic. In accordance with the principles described in this disclosure, the battery cells may include any appropriate shape, including cylindrical, prismatic, rectangular, cubical, triangular, circular, ovular, symmetric, asymmetric, other shapes, or combinations thereof. In some cases, at least some individual battery cells are enclosed by a rigid structure, and a collection of these individual battery cells are stacked within the rigid casing of the battery assembly. In other examples, the battery cells may be each encompassed with a flexible pouch. The swell detection circuitry described in the present disclosure may be used to detect swelling of battery cells with hard structures, flexible pouches, or other types of coverings, or combinations thereof.

For the purposes of this disclosure, the term "touch input component" may generally refer to components that allow a user to provide an input to the portable electronic device through a touch or proximity input. Often, these touch input components may include self-capacitance devices, mutual capacitance devices, capacitance devices, other types of device, or combinations thereof. A non-exhaustive list of touch input components may include, but is not limited to, touch pads, touch screens, other types of touch input components, or combinations thereof.

For the purposes of this disclosure, the term "touch logic circuitry" may generally refer to logic that is incorporated into the touch input component that can interpret the measurements coming from the electrodes of the touch input component. In some cases, the interpretation of these measurements are sent to an embedded processor or another subsystem located on a system board of the portable electronic device.

For the purposes of this disclosure, the term "dome" may generally refer to any depressible material that is positioned so that a portion of the dome is spaced at a distance away from the electrode. The dome may be made of an electrically conductive material, such as a metal, an electrically conductive plastic, another type of material, or combinations thereof. The dome may have a generally hemispherical shape, a generally oval shape, a generally symmetric shape, a generally asymmetric shape, a generally triangular shape, a generally oblong shape, another type of shape, or combinations thereof. The shape of the dome may include at least one rounded surface. Further, the dome may comprise a solid material that fully surrounds the electrode on a side of the touch sensor. In some examples, the solid material of the dome may fully block out all electromagnetic noise or other types of electromagnetic influences from the battery assembly, electronics in the portable electronic device, other components in the portable electronic device, or combinations thereof. In other examples, the dome may define openings or other types of through holes in its material.

For the purposes of this disclosure, the term "sense electrode" may generally refer to any type of electrically conductive material that can sense at least one position of the dome. For example, the sense electrode may be an electrode that is capable of detecting a change of capacitance when the dome changes from an undepressed position to a partially depression or a fully depression position. In some cases, such an electrode may be configured to detect varying degrees of the dome's depression by measuring different amounts of changes in capacitance even when a portion of the dome and the sense electrode are not in electrical contact with each other. In some examples, the sense electrode is in communication with capacitance sensing logic that can interpret the electrical measurements of the sense electrode and determine changes in capacitance. In some cases, the dome is the sense electrode and in other cases the electrode that works with the dome is the sense electrode.

In some cases where the sense electrode works with the dome, the sense electrode may be configured to sense when a portion of the dome is in electrical contact with the sense electrode. In some of these cases, the capacitance sensing logic may determine when the sense electrode and a portion of the dome are in physical contact based on the changes in capacitance or other electrical characteristics that occur on the sense electrode when the transmit electrode shorts to the sense electrode.

In some cases where the sense electrode works with the dome, the sense electrode is in communication with the capacitance sensing logic and resistance sensing logic, just to capacitance sensing logic, just to resistance sensing logic, to another type of logic, or combinations thereof. In examples, where the sense electrode is in communication with resistance sensing logic, the sense electrode may be used to determine when a portion of the dome comes into contact with the sense electrode.

In yet another example where the sense electrode works with the dome, the sense electrode may be part of a circuit, and when a portion of the dome comes into contact with the sense electrode, the portion of the dome may complete the circuit allowing electricity to flow through the circuit. In such an example, it may be determined that the dome is fully depressed when electricity is flowing through the circuit. In yet another example, the circuitry may be configured to close when a portion of the dome comes into contact with the sense electrode. In such an embodiment, it may be determined that the dome is fully depressed when electricity stops flowing through the circuit.

For the purposes of this disclosure, the term "complete depression" or "fully depressed" may be used interchangeably to indicate that the dome has moved past a threshold depression level that is generally associated with the dome being depression all the way or close to being depressed all the way. In some cases, the dome may make physical contact with the electrode to be considered fully depressed. However, in some examples, the dome, even when fully depressed, may not make physical contact with the electrode. In such an example, the fully depressed status of the dome may be determined through capacitance measurements.

For the purposes of this disclosure, the term "partial depression" or "partly depressed" may be used interchangeably to indicate that the dome has not moved past a threshold depression level that is generally associated with the dome being depression all the way or close to being depressed all the way. Generally, the dome does not make physical contact with the electrode when only being partly depressed. Generally, the partial depressed status of the dome may be determined through capacitance measurements.

For the purposes of the disclosure, the term "snap" may generally refer to when the dome makes a sudden movement towards a complete depression. Often, in those examples where the dome is a snapping dome, the dome may slowly be depressed at a constant rate where the dome moves at a substantially proportional distance compared to the amount of force applied to the dome. However, when the dome snaps, the dome may move suddenly and at a distance that is disproportionately farther per force than when the dome moves at the previously constant rate. Generally, a dome may be constructed to partially depress at lower forces and caused to snap after a specific threshold of force is applied to the dome. In some examples, after snapping, the dome may be in a completely depressed position.

For the purposes of this disclosure, a "non-snapping dome" may generally refer to a dome that is not constructed to exhibit snapping characteristics. For the purposes of this disclosure, the term "baseline capacitance" may generally refer to a capacitance measured when the dome is in an undepressed position. In some examples, the baseline capacitance may be the measured capacitance when the dome is not even partially depressed. For the purposes of this disclosure, the term "baseline resistance" may generally refer to the resistance measured when the dome is not in contact with the electrode. In some examples, a baseline resistance may be measured when the dome is not depressed or is just partially depressed.

For the purposes of the disclosure, a "membrane switch" may generally refer to an electrical switch that has a flexible electrically conductive membrane. The flexible electrically conductive membrane may be fixed on its edges to a frame, and the middle portion of the membrane may be urged in different direction based on an application of force. The flexible electrically conductive membrane may be made of any appropriate electrically conductive material that has sufficient flexibility to move in response to the application of a force. For the purposes of this disclosure, a "conductive pill switch" may generally refer to a rigid electrically conductive material that is configured to move so that the rigid electrically conductive material is position to either complete or open a circuit. The conductive pill may be any appropriate material, such as, but not limited to, carbon, gold, silver, copper, nickel, iron, another type of metal, an electrically conductive plastic, another type of electrically conductive material, mixtures thereof, alloys thereof, or combination thereof.

FIG. 1 depicts an example of a portable electronic device 100. In this example, the portable electronic device is a laptop. In the illustrated example, the portable electronic device 100 includes input components, such as a keyboard 102 and a touch pad 104. The portable electronic device 100 also includes a display 106. A program operated by the portable electronic device 100 may be depicted in the display 106 and controlled by a sequence of instructions that are provided by the user through the keyboard 102 and/or through the touch pad 104. An internal battery (not shown) may be used to power the operations of the portable electronic device 100.

The keyboard 102 includes an arrangement of keys 108 that can be individually selected when a user presses on a key with a sufficient force to cause the key 108 to be depressed towards a switch located underneath the keyboard 102. In response to selecting a key 108, a program may receive instructions on how to operate, such as a word processing program determining which types of words to process. A user may use the touch pad 104 to add different types of instructions to the programs operating on the computing device 100. For example, a cursor depicted in the display 106 may be controlled through the touch pad 104. A user may control the location of the cursor by sliding his or her hand along the surface of the touch pad 104. In some cases, the user may move the cursor to be located at or near an object in the computing device's display and give a command through the touch pad 104 to select that object. For example, the user may provide instructions to select the object by tapping the surface of the touch pad 104 one or more times.

The touch pad 104 may include a capacitance sensor disposed underneath a surface containing the keyboard 102. In some examples, the touch pad 104 is located in an area of the keyboard's surface where the user's palms may rest while typing. The capacitance sensor may include a printed circuit board that includes a first layer of electrodes oriented in a first direction and a second layer of electrodes oriented in a second direction that is transverse the first direction. These layers may be spaced apart and/or electrically isolated from each other so that the electrodes on the different layers do not electrically short to each other. Capacitance may be measured between the electrodes on the different layers. However, as the user's finger or other electrically conductive objects approach the electrodes, the capacitance may change. These capacitance changes and their associated locations may be quantified to determine where the user is touching or hovering his or her finger within the area of the touch pad 104. In some examples, the first set of electrodes and the second set of electrodes are equidistantly spaced with respect to each other. Thus, in these examples, the sensitivity of the touch pad 104 is the same in both directions. However, in other examples, the distance between the electrodes may be non-uniformly spaced to provide greater sensitivity for movements in certain directions.

In some cases, the display 106 is mechanically separate and movable with respect to the keyboard with a connection mechanism 114. In these examples, the display 106 and keyboard 102 may be connected and movable with respect to one another. The display 106 may be movable within a range of 0 degrees to 180 degrees with respect to the keyboard 102. In some examples, the display 106 may fold over onto the upper surface of the keyboard 102 when in a closed position, and the display 106 may be folded away from the keyboard 102 when the display 106 is in an operating position. In some examples, the display 106 may be orientable with respect to the keyboard 102 at an angle between 35 to 135 degrees when in use by the user. However, in these examples, the display 106 may be positionable at any angle desired by the user.

In some examples, the display 106 may be a non-touch sensitive display. However, in other examples at least a portion of the display 106 is touch sensitive. In these examples, the touch sensitive display may include a capacitance sensor that is located behind an outside surface of the display 106. As a user's finger or other electrically conductive object approaches the touch sensitive screen, the capacitance sensor may detect a change in capacitance as an input from the user.

Figure 2:
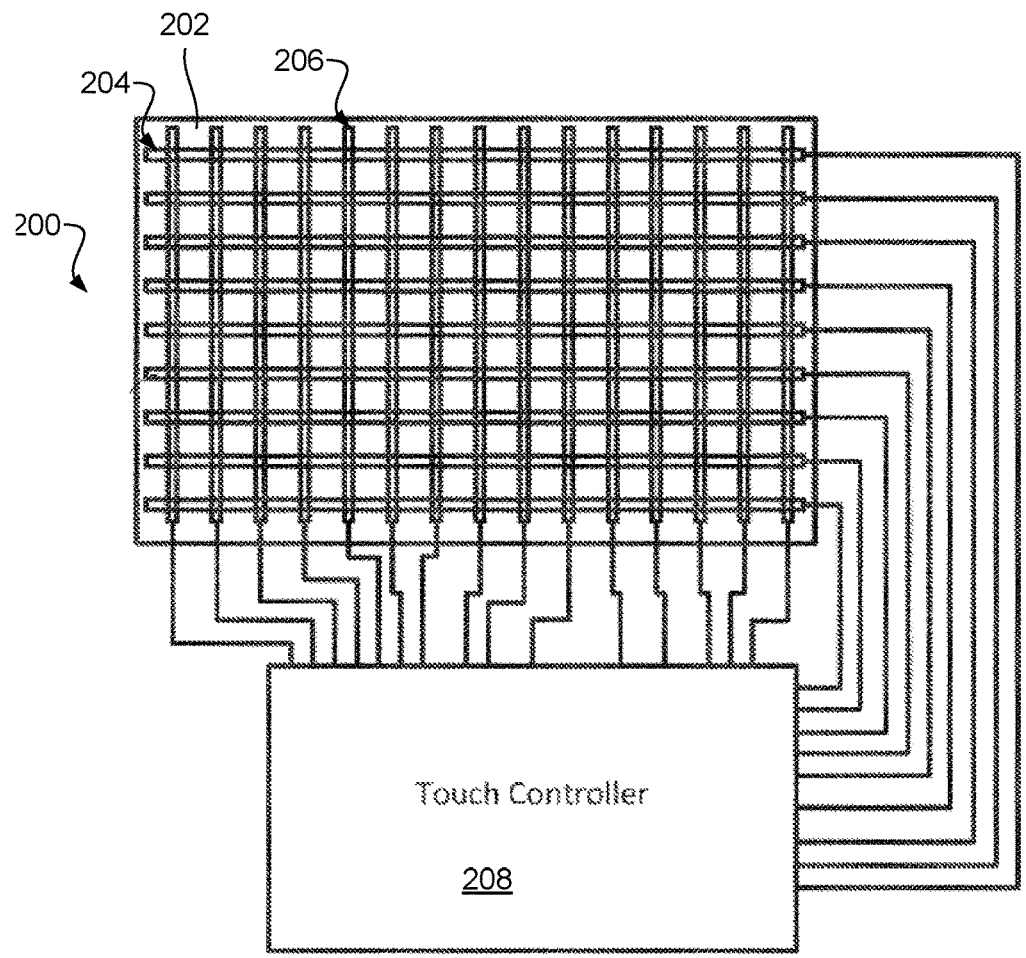
FIG. 2 depicts an example of a substrate with a first set of electrodes and a second set of electrodes in accordance with this disclosure.

FIG. 2 depicts an example of a portion of a touch input component 200. In this example, the touch input component 200 may include a substrate 202, first set 204 of electrodes, and a second set 206 of electrodes. The first and second sets 204, 206 of electrodes may be oriented to be transverse to each other. Further, the first and second sets 204, 206 of electrodes may be electrically isolated from one another so that the electrodes do not short to each other. Where electrodes from the first set 204 overlap with electrodes from the second set 206, capacitance can be measured. The touch input component 200 may include one or more electrodes in the first set 204 or the second set 206. Such a substrate 202 and electrode sets may be incorporated into a touch screen, a touch pad, and/or swell detection circuitry incorporated into a battery assembly.

In some examples, the touch input component 200 is a mutual capacitance sensing device. In such an example, the substrate 202 has a set 204 of row electrodes and a set 206 of column electrodes that define the touch/proximity-sensitive area of the component. In some cases, the component is configured as a rectangular grid of an appropriate number of electrodes (e.g., 8-by-6, 16-by-12, 9-by-15, or the like).

As shown in FIG. 2, the touch input controller 208 includes a touch controller 208. The touch controller 208 may include at least one of a central processing unit (CPU), a digital signal processor (DSP), an analog front end (AFE) including amplifiers, a peripheral interface controller (PIC), another type of microprocessor, and/or combinations thereof, and may be implemented as an integrated circuit, a field programmable gate array (FPGA), an application specific integrated circuit (ASIC), a combination of logic gate circuitry, other types of digital or analog electrical design components, or combinations thereof, with appropriate circuitry, hardware, firmware, and/or software to choose from available modes of operation.

In some cases, the touch controller 208 includes at least one multiplexing circuit to alternate which of the sets 204, 206 of electrodes are operating as drive electrodes and sense electrodes. The driving electrodes can be driven one at a time in sequence, or randomly, or multiple at the same time in encoded patterns. Other configurations are possible such as a self-capacitance mode where the electrodes are driven and sensed simultaneously. Electrodes may also be arranged in non-rectangular arrays, such as radial patterns, linear strings, or the like. A ground plane shield (see FIG. 3) may be provided beneath the electrodes to reduce noise or other interference. The shield may extend beyond the grid of electrodes. Other configurations are also possible.

In some cases, no fixed reference point is used for measurements. The touch controller 208 may generate signals that are sent directly to the first or second sets 204, 206 of electrodes in various patterns.

In some cases, the component does not depend upon an absolute capacitive measurement to determine the location of a finger (or stylus, pointer, or other object) on a surface of the touch input component 200. The touch input component 200 may measure an imbalance in electrical charge to the electrode functioning as a sense electrode which can, in some examples, be any of the electrodes designated in either set 204, 206 or, in other examples, with dedicated-sense electrodes. When no pointing object is on or near the touch input component 200, the touch controller 208 may be in a balanced state, and there is no signal on the sense electrode. When a finger or other pointing object creates imbalance because of capacitive coupling, a change in capacitance may occur at the intersections between the sets of electrodes 204, 206 that make up the touch/proximity sensitive area. In some cases, the change in capacitance is measured. However, in an alternative example, the absolute capacitance value may be measured.

While this example has been described with the touch input component 200 having the flexibility of the switching the sets 204, 206 of electrodes between sense and transmit electrodes, in other examples, each set of electrodes is dedicated to either a transmit function or a sense function.

While the example of FIG. 2 describes a mutual capacitance arrangement for measuring changes in capacitance, in other examples, the system may include a self-capacitance arrangement for measuring changes in capacitance. Such an arrangement may include a single set of electrodes that transmits a drive signal. Then using the same set of electrodes that previously transmitted the drive signal, sensing changes in capacitance.

In some examples, the depicted touch controller 208 may be in communication with a dome attached to the touch sensor. This dome may be positioned to sense changes in an interior of a portable electronic device. One such example of a change may be due to battery swelling. In this type of example, as the battery swells, the dome may be depressed. When the dome is partially or fully depressed, the touch controller 208 may determine that a battery is swelling.

Figure 3:
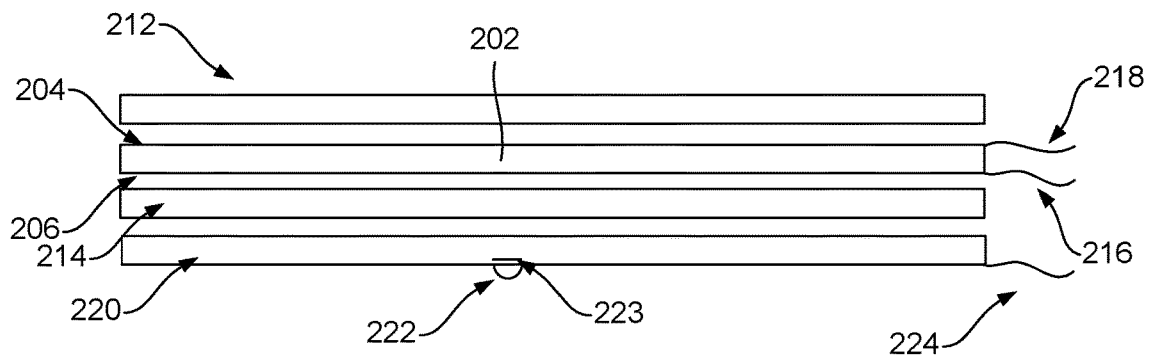
FIG. 3 depicts an example of a touch pad in accordance with this disclosure.

FIG. 3 depicts an example of a substrate 202 with a first set 204 of electrodes and a second set 206 of electrodes deposited on the substrate 202 that is incorporated into a touch pad. The first set 204 of electrodes and the second set 206 of electrodes may be spaced apart from each other and electrically isolated from each other. In the example depicted in FIG. 3, the first set 204 of electrodes is deposited on a first side of the substrate 202, and the second set 206 of electrodes is deposited on the second side of the substrate 202. The second side is opposite the first side and spaced apart by the thickness of the substrate 202. The substrate may be made of an electrically insulating material thereby preventing the first and second sets 204, 206 of electrodes from shorting to each other. As depicted in FIG. 2, the first set 204 of electrodes and the second set 206 of electrodes may be oriented transversely to one another. Capacitance measurements may be taken where the intersections with the electrodes from the first set 204 and the second set 206 overlap or come into close enough proximity to each other. In some examples, a voltage may be applied to the transmit electrodes and the voltage of a sense electrode that overlaps with the transmit electrode may be measured. The voltage from the sense electrode may be used to determine the capacitance at the intersection where the sense electrode overlaps with the transmit electrode.

In examples that use self-capacitance to measure changes in capacitance, a single set of electrodes may be deposited on the substrate. In such an example, the single set of electrodes may both transmit the drive signal and sense the changes in capacitance.

FIG. 3 depicts a cross section of a touch pad, and the substrate 202 may be located between a touch surface 212 and a shield 214. The touch surface 212 may be a covering that is placed over the first side of the substrate 202 and that is at least partially transparent to electric fields. As a user's finger or stylus approach the touch surface 212, the presence of the finger or the stylus may affect the electric fields on the substrate 202. With the presence of the finger or the stylus, the voltage measured from the sense electrode may be different than when the finger or the stylus are not present. As a result, the change in capacitance may be measured.

The shield 214 may be an electrically conductive layer that shields electric noise from the internal components of the portable electronic device. This shield may prevent influence on the electric fields on the substrate 202.

The voltage applied to the transmit electrodes may be carried through an electrical connection 216 from the touch controller 208 to the appropriate set of electrodes. The voltage applied to the sense electrode through the electric fields generated from the transmit electrode may be detected through the electrical connection 218 from the sense electrodes to the touch controller 208.

In the example depicted in FIG. 3, the shield 214 may be positioned between the first substrate 202 and a second substrate 220. The first and/or second substrate may be made of any appropriate material including, but not limited to printed circuit board, another type of substrate, or combinations thereof.

Another set of electrodes 223 may be deposited on the second substrate 220 of the touch sensor. This electrode may be connected to a physically connection 224 that connects to the touch controller, capacitance sensing logic, a drive signal generator, resistance sensing logic, an ohm meter, a voltmeter, another measurement instrument, or combinations thereof. In some cases, the set of electrodes is a single electrode. However, in other examples, the set of electrodes may include multiple electrodes. The set of electrodes 223 may be part of a capacitance measuring circuit, a resistance measuring circuit, another type of measuring circuit, an open/close switch, a component of another type of circuit, or combinations thereof.

The set of electrodes 223 may be located within an area co-occupied with a dome 222 that is also connected to the second substrate 220. The dome may be wholly or partially made of an electrically conductive material. Any appropriate type of dome may be used. A non-exhausted list of dome types includes, but it not limited to, snapping domes, non-snapping domes, generally triangular shaped domes, generally hemispherical shaped domes, generally square shaped domes, solid domes, domes with at least one through opening, generally asymmetric shaped domes, generally symmetric shaped domes, domes with other general types of shapes, or combinations thereof.

In some examples, the dome 222 completely or at least partially shields the electrode 223 from the electromagnetic interference that the touch sensor is exposed to on the same side of the touch sensor having the second substrate 220. In some examples, the shield 214 may completely or at least partially shield the electrode 223 from electromagnetic interference from the electrodes on the first substrate 202 or other types of electromagnetic interference coming from the first side of the touch sensor. In some such examples, the electrode 223 may be completely shielded from the all or at least some electromagnetic interference from outside sources.

In some cases, the dome 222 and the electrode 223 may be part of a capacitance sensing circuit. For example, the electrode 223 may be a sense electrode and the electrically conductive dome 222 may be a transmit electrode. When a drive signal is driven on the dome in an undepressed condition, the electrode may sense a baseline level of capacitance. When the drive signal is drive on the dome, and the dome is partially depressed, the measured amount of capacitance sensed with the sense electrode may change from the baseline level of capacitance. This change of capacitance may be associated with the amount that the dome is partially depressed. In some cases, when the dome is completely depressed, the sense electrode may measure a greater change from the baseline capacitance that corresponds with a completely depressed dome. In this manner, the capacitance sensing circuit may determine when the dome is fully depressed, partially depressed, various degrees of partial depression, and fully depressed. One advantage to this arrangement is that outside sources that may cause electromagnetic interference are blocked from affecting the reading on the sense electrode. This may prevent false positive readings. However, such an arrangement may also provide the advantage that such a capacitance sensing circuit may be calibrated before the touch pad is inserted into a computing device. Otherwise, in some cases, if the capacitance circuit was calibrated outside of a computing device and then inserted into a computing device, the calibration may no longer represent the environment in which the capacitance sensing circuit is located. Thus, this arrangement described in this disclosure may allow the circuit to be calibrated inside or outside of the computing device. In such examples where the calibrations are specific to a sense electrode in a self-contained environment defined by the dome, recalibrating the circuit may not be necessary when the parts of the computing device are replaced at some point after manufacturing and/or become damaged.

The touch sensor and/or dome 222 may be positioned adjacent to a battery assembly within a computing device so that swelling of the battery may exert a force on the dome sufficient to partially or completely depress the dome 222. The amount of swelling may also be determined based on the capacitance value measured. In some examples, the greater the change in capacitance from the baseline capacitance, the greater the amount of swelling. In some cases, a completely depressed dome may exhibit the greatest change in capacitance that the circuit is capable of detecting. In some cases, a completely depressed dome may come into contact with the electrode, causing a short, which may affect the capacitance. Such contact may change a measurement in resistance of the circuit. In other examples, when the dome is depressed to the point where the dome makes physical contact with electrode, it may result in a switch being opened or closed and changing the electrical flow of current through the circuit. In some cases, the dome 222 and electrode 223 arrangement are not part of a capacitance circuit, but are rather part of another type of circuit that only detects battery swelling when the dome 222 contacts the electrode 223.

In other examples, when the dome 222 is fully depressed, the dome 222 is not configured to make contact with the electrode 223. In such an example, no electrical shorting takes place. In such an example, the circuit may be a capacitance sensing circuit and the degree of the dome's displacement may be determined based on the capacitance measurement.

Figure 4:
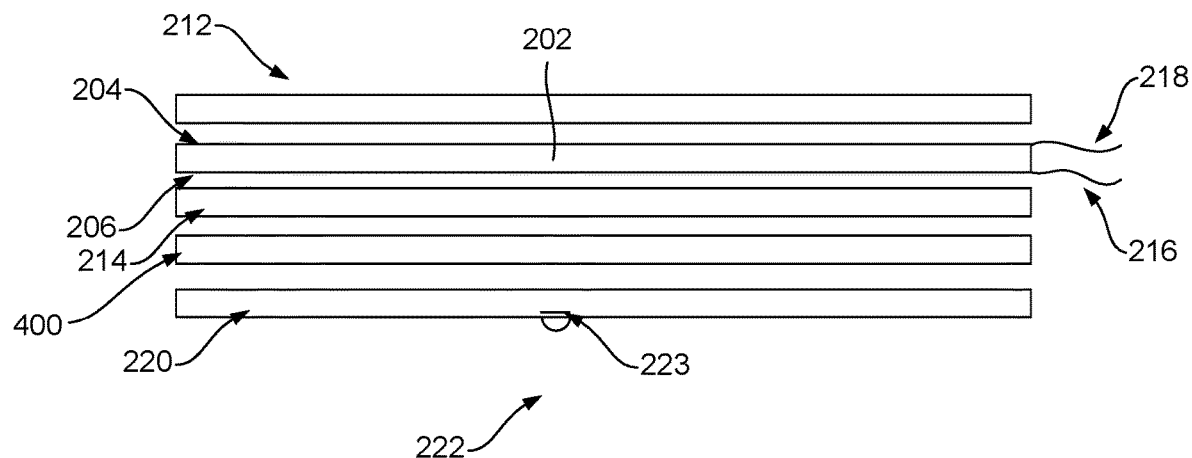
FIG. 4 depicts an example of a touch screen in accordance with this disclosure.

FIG. 4 depicts an example of a touch screen as the touch input component. In this example, the substrate 202, sets of electrodes 204, 206, and electrical connections 216, 218 may be similar to the arrangement described in conjunction with FIG. 3. In the example of FIG. 4, the shield 214 is located between the substrate 202 and a display 400. The display 400 may be a layer of pixels or diodes that illuminate to generate an image. The display may be a liquid crystal display, a light emitting diode display, an organic light emitting diode display, an electroluminescent display, a quantum dot light emitting diode display, an incandescent filaments display, a vacuum florescent display, a cathode gas display, another type of display, or combinations thereof. In this example, the shield 208, the substrate 202, and the touch surface 212 may each be at least partially optically transparent to allow the display to be visible to the user through the touch surface 212. Such a touch screen may be included in a monitor, a display assembly, a laptop, a mobile phone, a mobile device, an electronic tablet, another type of portable electronic device, or combinations thereof.

In the example depicted in FIG. 4, a substrate 220 may be included. The substrate 220 may include a dome 222 and an electrode 223 that works with the dome 222 to measure when the dome 222 is depressed. Such a substrate 220, dome 222, and electrode 223 may be included in the touch display such that the dome 222 is positioned next to a battery assembly and can determine when the battery assembly is swelling. While not shown in the example of FIG. 4, another shield in some examples may be disposed in the touch display to minimize and/or prevent electromagnetic interference with from other components of the touch sensor, the display, or other components of the computing device.

Figure 5:
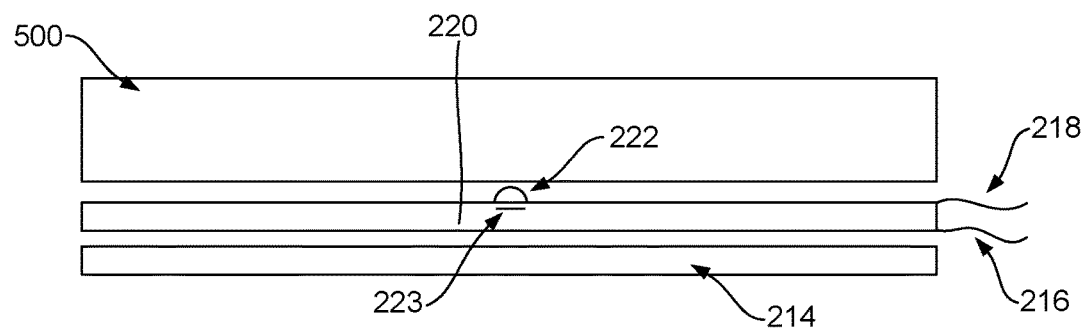
FIG. 5 depicts an example of a battery assembly in accordance with this disclosure.

FIG. 5 depicts an example of swell detection circuitry incorporated into a battery assembly. The substrate 220, the electrode 223, dome 222, and shield 214 may be similar to the arrangement described in conjunction with FIG. 3. In the example of FIG. 5, the substrate 220 may be incorporated into the swell detection circuitry, which is not incorporated into touch pad or a touch display. In this example, the battery cell 500 may be positioned adjacent to the substrate 220 with may be located completely within the interior of a computing device. In the illustrated example, the substrate 220 is located between the shield 214 and the battery cell 500. The shield 214 may prevent electrical interference from components within the portable electronic device.

Figure 6:
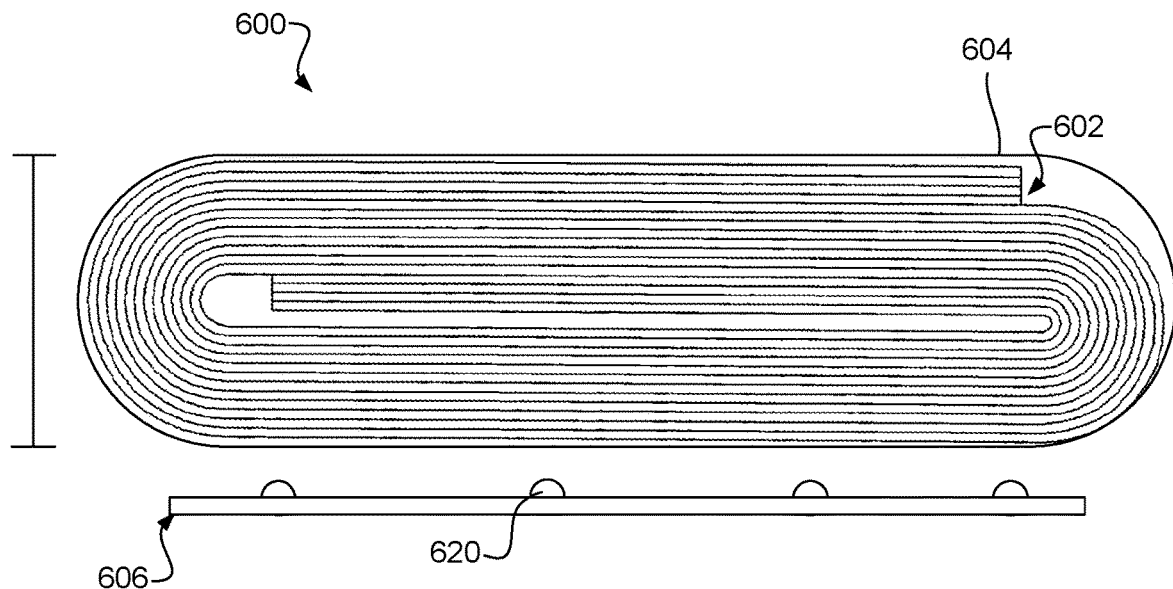
FIG. 6 depicts an example of a battery cell in accordance with this disclosure.

FIG. 6 depicts a cross section of an example of a battery cell 600. In this example, the battery cell 600 includes multiple metal layers 602 arranged side by side and rolled together. The metal layers are disposed within a pouch 604. In this example, swell detection circuitry 606 with a dome 620 is adjacent from the battery cell 600.

Figure 7:
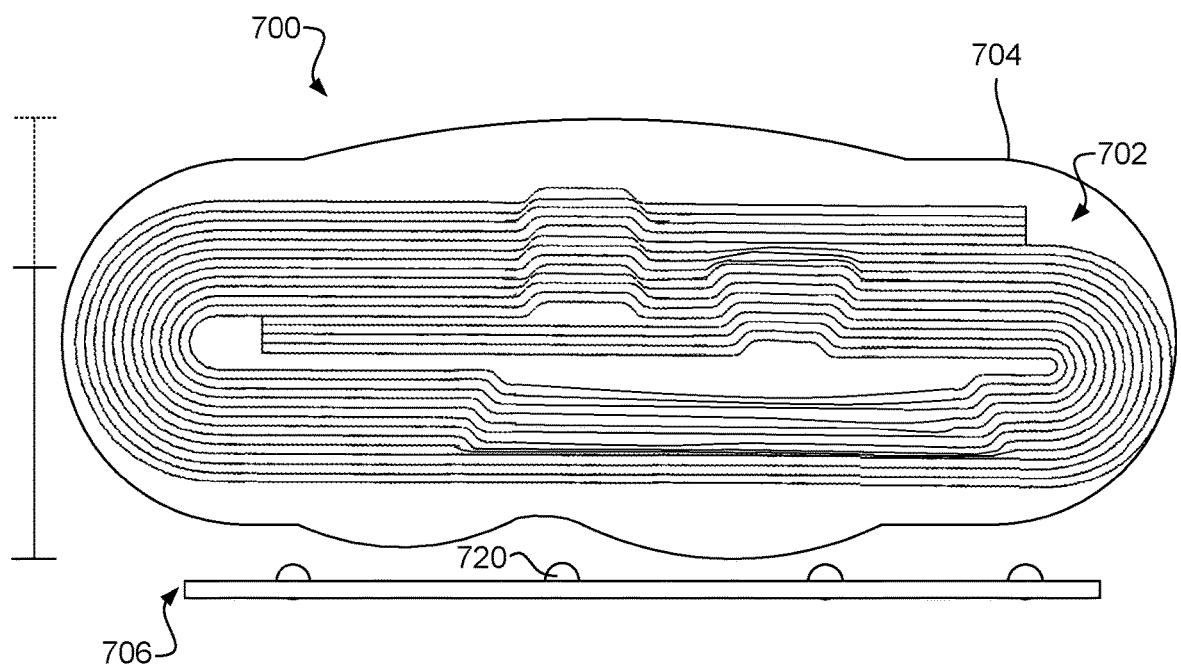
FIG. 7 depicts an example of a swollen battery cell in accordance with this disclosure.

FIG. 7 depicts an example of a swollen battery 700 due to out gassing from the metal layers 702. In this example, the gas increases the pressure between the metal layers 702 causing separation between the metal layers. Additionally, the increased internal pressure may also expand the flexible pouch 704 (or rigid structure in other examples) outward. Separation between the metal layers 702 and/or expansion of the pouch 704 may increase the battery's overall size and therefore narrow the gap between the battery cell and the swell detection circuitry 706. As illustrated in this example, the battery assembly 700 may be positioned at a distance away from the battery detection circuitry 706 such that some degree of battery swelling is permitted before the expanded portions of the battery come into contact with the dome 720. However, in other examples, the dome 720 may be positioned up against the battery assembly such that a gap between the battery and the dome is minimal, if a gap exists at all.

Figure 8:
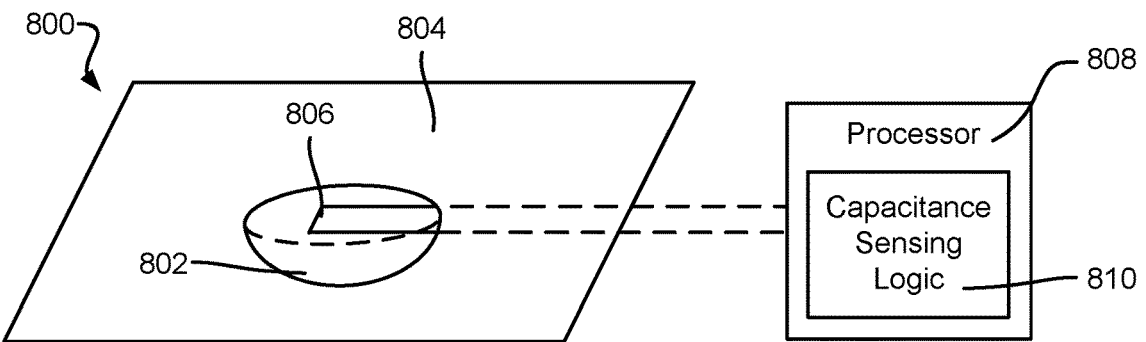
FIG. 8 depicts an example of a battery swell detection unit in accordance with this disclosure.

FIGS. 8-14 depict various embodiments of a battery detection unit 800 using a dome 802 to detect the battery swell. In FIG. 8, the battery detection unit 800 includes a substrate 804, the dome 802 connected to the substrate 804, and an electrode 806 positioned to detect the amount that the dome 802 is depressed. In the example of FIG. 8, the electrode 806 is connected to a processor 808 with capacitance sensing logic 810. In such an example, the electrode 806 may be a sense electrode in a capacitance sensing circuit. In such an example, the circuit may use capacitance measurements to determine whether the dome 802 is undepressed (baseline position), partially depressed, or completely depressed. In some cases, the capacitance sensing logic may be capable of granularly determining how much the dome 802 is depressed. In such an example, the processor 808 may report to a user or to a device the degree to which the dome 802 is depressed.

Figure 9:
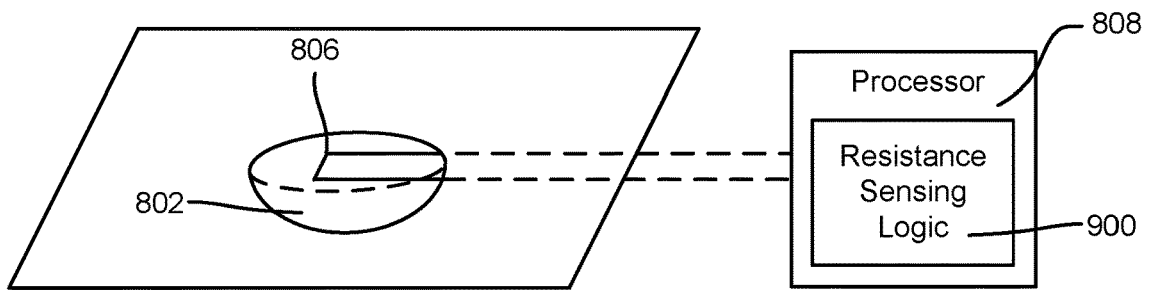
FIG. 9 depicts an example of a battery swell detection unit in accordance with this disclosure.

In the example of FIG. 9, the electrode 806 is connected of a processor 808 that includes resistance sensing logic 900. In this example, the resistance sensing logic 900 may determine when the resistance on the circuit changes. The resistance may change when the dome 802 makes physical contact with the electrode. Thus, in this example, the resistance sensing logic may be configured to determine when the dome is completely depressed.

Figure 10:
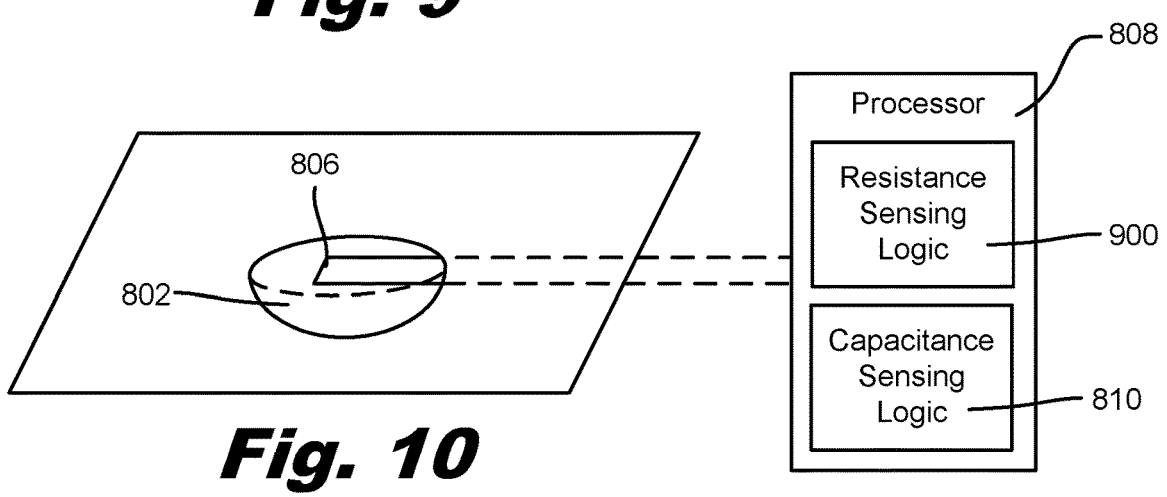
FIG. 10 depicts an example of a battery swell detection unit in accordance with this disclosure.

In the example of FIG. 10, the electrode 806 is connected to a processor 808 that is connected to both capacitance sensing logic 810 and resistance sensing logic 900. In such an example, the circuitry may use the capacitance sensing logic 810 to determine when the dome 802 is partially and/or completely depressed, and use the resistance sensing logic 900 to also detect when the dome is completely depressed. In some cases, the capacitance sensing logic 810 is primarily used to determine when the dome 802 is partially depressed, and the resistance sensing logic 900 is primarily used to determine when the dome 802 is completely depressed.

Figure 11:
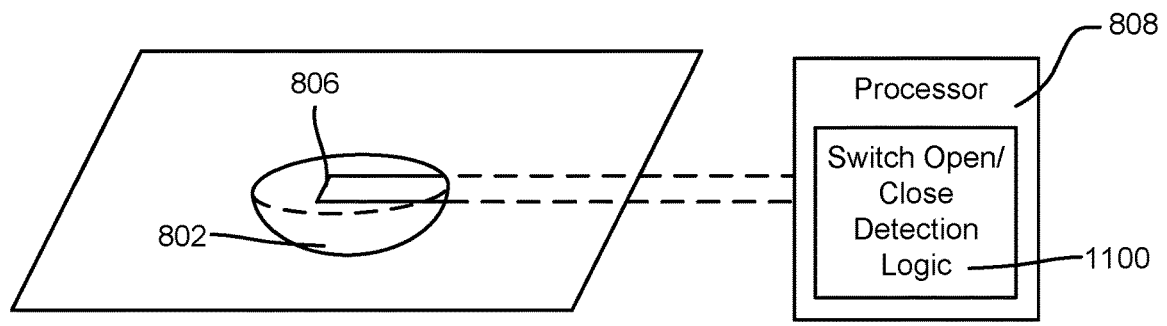
FIG. 11 depicts an example of a battery swell detection unit in accordance with this disclosure.

FIG. 11 depicts an example where the processor 808 includes switch open/close detection logic 1100. In this example, the processor 808 may determine when the dome 802 comes into contact with the electrode 806. When the dome 802 and the electrode 806 come into contact, the connection may complete a circuit thus causing a flow of electrical current to flow through the switch. In other examples, when the pressure on the dome 802 is removed, the dome 802 may move away from the electrode 806 causing the switch to close. In yet another example, a switch may be open when the dome 802 is separated from the electrode 806, and when the dome 802 and the electrode 806 come into contact with each other, the switch may be caused to closed.

Figure 12:
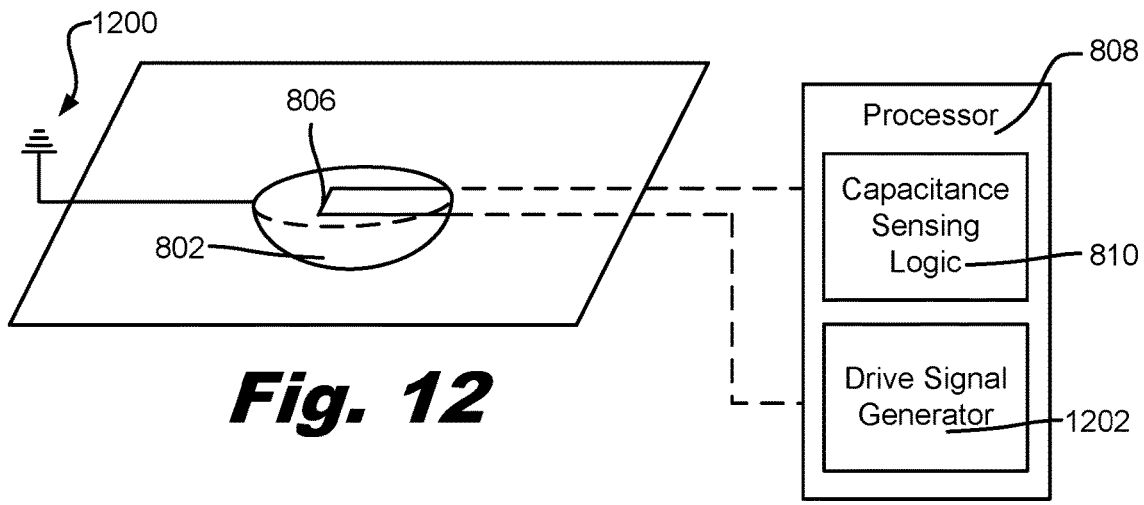
FIG. 12 depicts an example of a battery swell detection unit in accordance with this disclosure.

FIG. 12 depicts an example where the dome 802 is electrically connected to ground 1200. In this example, the processor 808 may include a drive signal generator 1202 and capacitance sensing logic 810. In such an example, the circuit may use self-capacitance to determine the depression amount, if any, of the dome 802. For example, the drive signal generator 1202 may impose a drive signal on the electrode 806 over a short period of time and the same electrode 806 may be used to measure any changes in capacitance.

Figure 13:
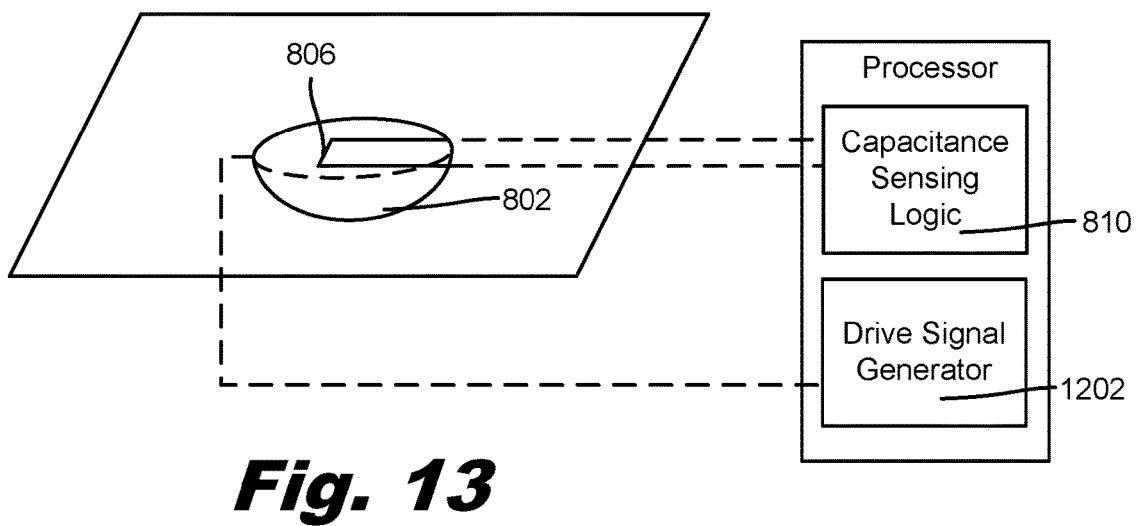
FIG. 13 depicts an example of a battery swell detection unit in accordance with this disclosure.

In the example of FIG. 13, the dome 802 is connected to the drive signal generator 1202, and the electrode 806 is connected to the capacitance measuring logic 810. In this example, the drive signal may be imposed on the dome 802 and the sense electrode 806 may be used to measure the change in capacitance between the dome 802 and the electrode 806. In this example, mutual capacitance may be used to determine the amount of depression in the dome 802.

Figure 14:
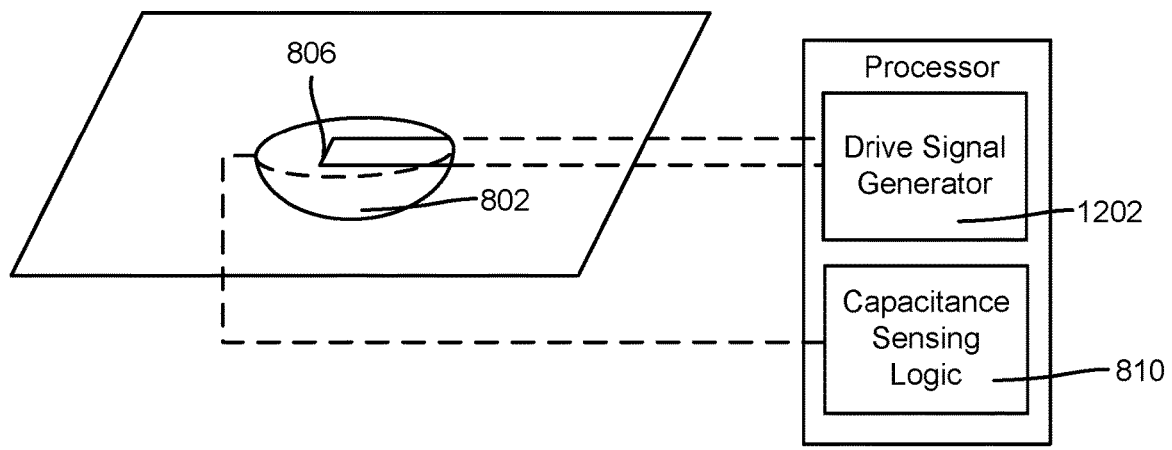
FIG. 14 depicts an example of a battery swell detection unit in accordance with this disclosure.

FIG. 14 depicts an alternative where the dome 802 is connected to the capacitance sensing logic 810 and the electrode 806 is connected to the drive signal generator 1202. In this example, the drive signal may be imposed on the electrode 806 and the change in capacitance may be measured with the dome 802.

Figure 15:
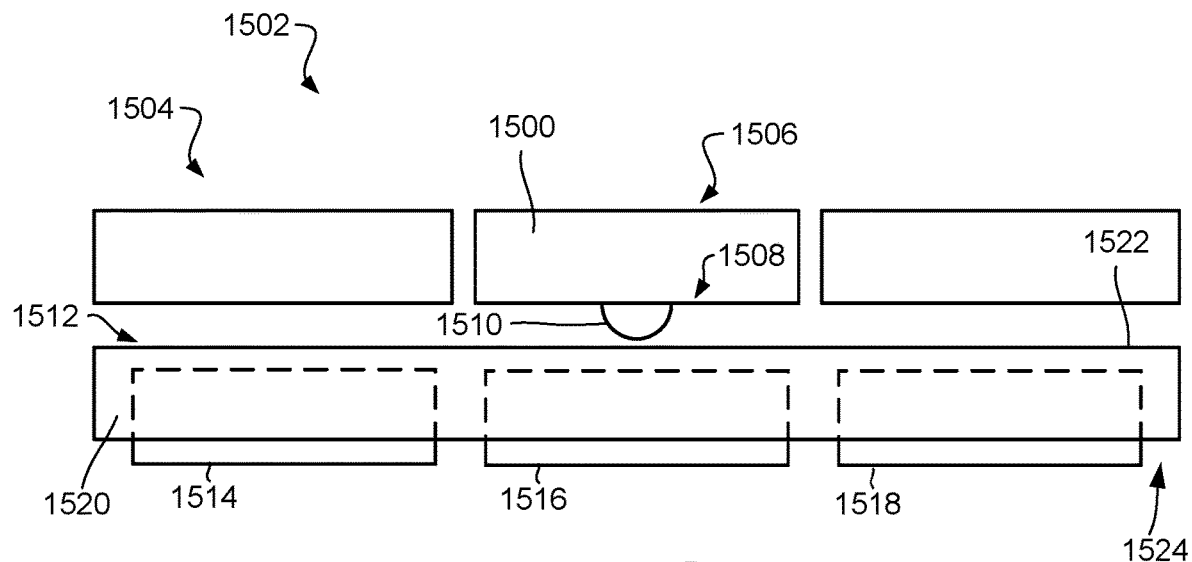
FIG. 15 depicts an example of swell detection within an interior of a portable electronic device in accordance with this disclosure.

FIG. 15 depicts an example where a touch sensor 1500 is incorporated into a portable computing device 1502. In some examples, the portable computing device 1502 is a laptop, a phone, an electronic tablet, a vehicle, a hybrid vehicle, an electric vehicle, a plane, a helicopter, a boat, another type of device, or combinations thereof. In this example, the touch sensor is incorporated into a user surface 1504. The touch sensor 1500 includes an input side 1506 where a user can use touch, proximity, and/or force commands to interact with the touch sensor 1500. The user surface 1504 of the portable electronic device 1502 may include an opening that provides the user access to the input side 1506 of the touch sensor 1500. On a battery detection side 1508 of the touch sensor 1500, a dome 1510 is positioned against the battery assembly 1512. In this example, a single dome 1510 is used to detect battery swelling.

In this example, the battery assembly 1512 includes multiple pouches 1514, 1516, 1518. Each of the pouches 1514, 1516, 1518 are partially situated in a rigid battery shell 1520. The rigid battery shell 1520 is closed on a rigid side 1522 that is located between the touch sensor 1500 and the battery pouches 1514, 1516, 1518. An open side 1524 of the rigid battery shell 1520 includes a cavity into which each of the battery pouches 1514, 1516, 1518 is located.

When one of the battery pouches 1514, 1516, 1518 expands, the rigid battery shell may be pushed towards the dome 1510. In some examples, the internal pressure of the swollen battery pouch may exert enough force to partially or completely depress the dome 1510. In some cases, when the battery swell only causes the dome 1510 to be partially depressed, the system may send a first command. A second command may be sent when the battery swell causes the dome 1510 to completely depress. For example, the first command may include a message with a warning that the battery is expanding, and the second command may include a message with instructions to replace the battery or to stop charging the battery to prevent further swelling.

Figure 16:
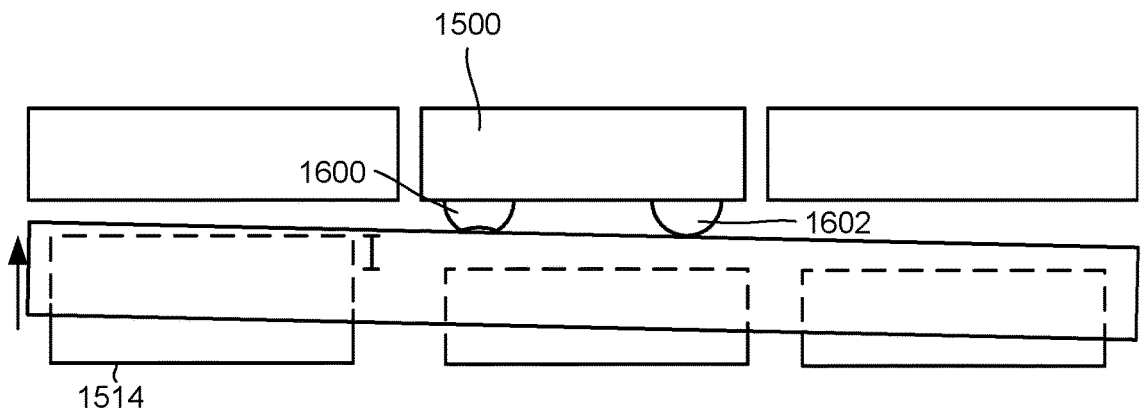
FIG. 16 depicts an example of swell detection within an interior of a portable electronic device in accordance with this disclosure.

FIG. 16 depicts an example where a first dome 1600 and a second dome 1602 are attached to the touch sensor 1500. In this example, the first and second domes 1600, 1602 expand the area which can detect battery swelling. In the example of FIG. 16, battery pouch 1514 is the only pouch that is swelling, which causes just one side of the rigid battery shell 1520 to move towards the touch sensor 1500 such that only one of the domes comes into contact with the rigid battery shell 1520.

Figure 17:
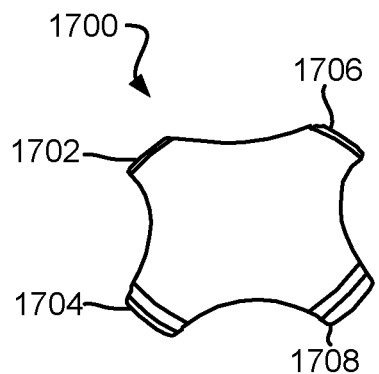
FIG. 17 depicts an example of a dome in accordance with this disclosure.

FIGS. 17-20 depicts different types of domes that may be used in accordance with the present disclosure. FIG. 17 depicts a dome 1700 that forms legs 1702, 1704, 1706, 1708 that mount to the substrate. These legs extend away from a body of the dome 1700.

Figure 18:
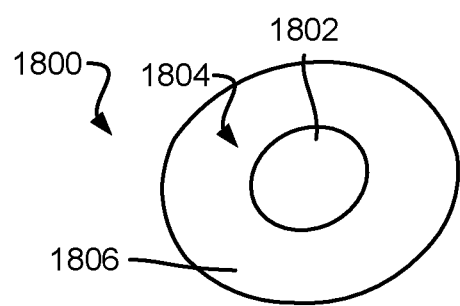
FIG. 18 depicts an example a dome in accordance with this disclosure.
Figure 19:
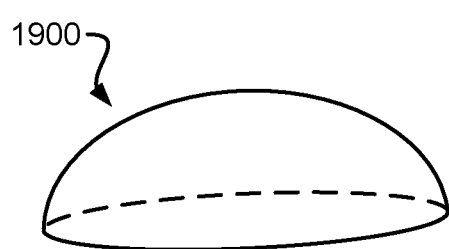
FIG. 19 depicts an example of a dome in accordance with this disclosure.
Figure 20:
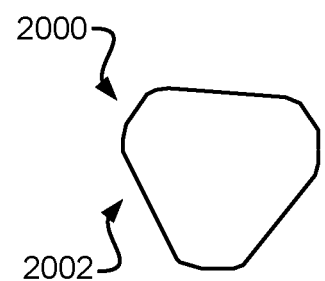
FIG. 20 depicts an example of a dome in accordance with this disclosure.

FIG. 18 depicts an example of a dome 1800 with an opening 1802 defined in a central location 1804 of the dome's body 1806. FIG. 19 depicts an example of a dome 1900 that is solid without openings. FIG. 20 depicts an example of a dome 2000 that includes a generally triangular shape 2002. While these examples depict various embodiments of domes, any appropriate type of dome may be used in accordance with the principles in this disclosure.

Figure 21:
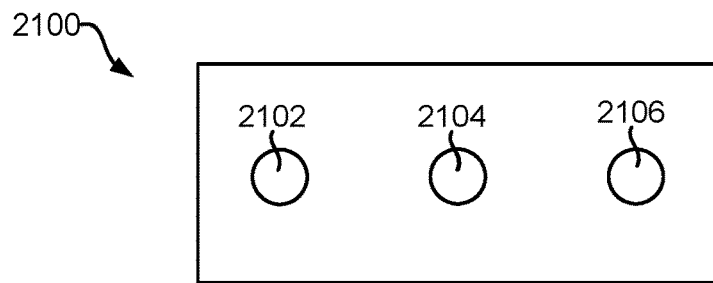
FIG. 21 depicts an example of an arrangement of domes in accordance with this disclosure.
Figure 22:
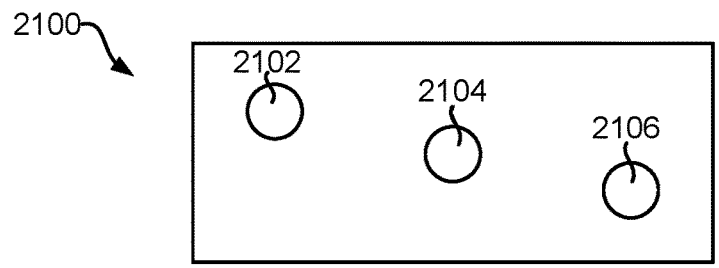
FIG. 22 depicts an example of an arrangement of domes in accordance with this disclosure.
Figure 23:
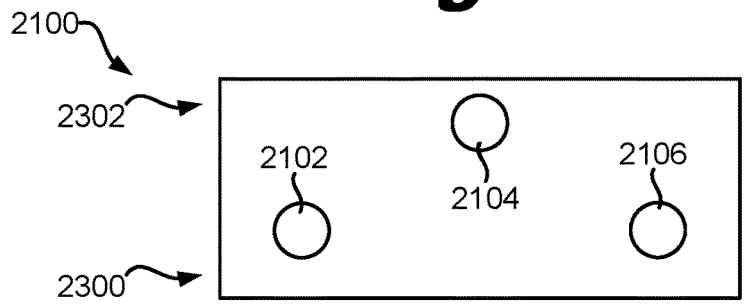
FIG. 23 depicts an example of an arrangement of domes in accordance with this disclosure.

FIGS. 21-23 depict examples of an arrangement of domes on a touch sensor 2100. In the example of FIG. 21, a first dome 2102, a second dome 2104, and a third dome 2106 are arranged in a straight row in a central location of the touch sensor 2100.

In the example of FIG. 22, the first dome 2102, the second dome 2104, and the third dome 2106 are arranged in angular row where the first dome 2102 is connected near a corner of the touch sensor 2100 that is opposite to another corner of the touch sense nearby which the third dome 2106 is connected. The second dome 2104 is connected to a central location of the touch sensor.

In FIG. 23, the first and third domes 2102, 2106 are connected to a first side 2300 of the touch sensor 2100 while the second dome 2104 is attached to a second side 2302 of the touch sensor 2100 in a triangular arrangement.

Figure 24:
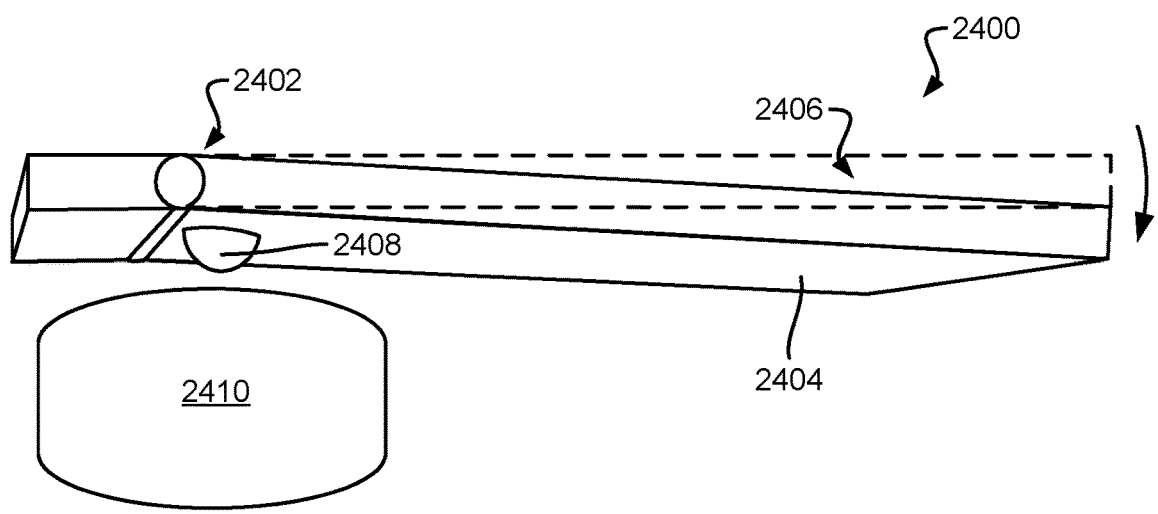
FIG. 24 depicts an example of a dome connected approximate a hinge edge of a touch sensor in accordance with this disclosure.

FIG. 24 depicts an example of a touch sensor 2400 that includes a hinged edge 2402. The hinged edge 2402 may allow the main body 2404 of the touch sensor 2400 to move with respect to the surface of the portable electronic device. For example, the touch sensor 2400 may be configured to have a push side 2406 that may allow a user to provide push input commands through the touch sensor 2400. The main body 2404 of the touch sensor 2400 may move downward on the push side 2406 when the hinged edge 2402 stays connected to the surface of the portable electronic device. In this example, the battery assembly 2410 may be positioned under the hinged edge of the touch sensor 2400. In this example, at least one dome 2408 is connected to the touch sensor 2400 proximate the hinged edge 2402. This arrangement may prevent the battery swell detection unit and/or battery swelling from interfering with the push command movements of a hinged touch sensor.

Figure 25A:
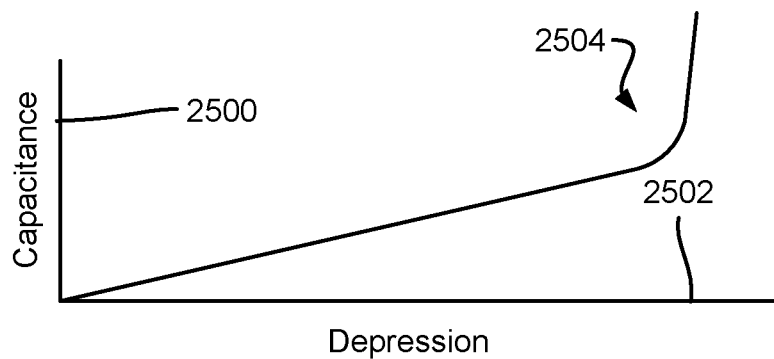
FIG. 25A depicts an example of a diagram depicting a measurement of capacitance in accordance with this disclosure.

FIG. 25A depicts a representation of the change of capacitance verses the amount of the dome's depression. In this example, the x-axis 2500 represents a change in capacitance, and the y-axis 2502 represents the depression of the dome. In this example, the change in capacitance may exhibit a general positive relationship where the greater the amount of depression of the dome, the greater the change in capacitance until there is a spike 2504 in the change of capacitance. The spike in the change of capacitance may represent the point of depression where the dome makes physical contact with the electrode.

Figure 25B:
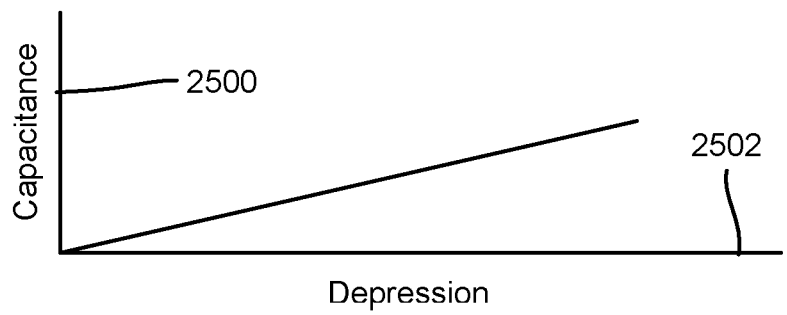
FIG. 25B depicts an example of a diagram depicting a measurement of capacitance in accordance with this disclosure.

FIG. 25B depicts a representation of the change in capacitance verse the amount of the dome's depression that is similar to the relationship depicted in FIG. 25A. However, in FIG. 25B, there is no spike in the change of capacitance when the dome is completely depressed. In this example, the dome is not configured to make contact with the electrode when the dome is fully depressed. Thus, in this example, the dome does not short to the electrode causing the spike in capacitance.

Figure 25C:
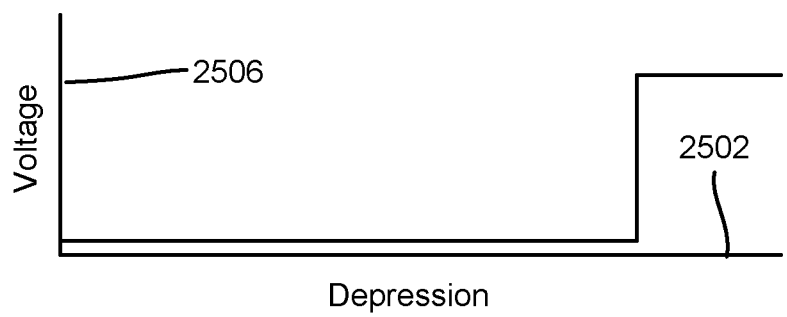
FIG. 25C depicts an example of a diagram depicting a measurement of voltage in accordance with this disclosure.

FIG. 25C depicts a representation of the change of voltage verses the amount of the dome's depression. In this example, the x-axis 2506 represents a change in voltage, and the y-axis 2502 represents the depression of the dome. In this example, the change in voltage exhibit a general flat relationship verse the amount of depression of the dome while the dome is just partially depressed. However, when the dome is fully depressed, the voltage changes instantly representing that the dome and the electrode have made physical contact.

FIGS. 26A and 26B represent an embodiment where the rigid battery shell 2600 is modified to move in a preferably way to make contact with the dome 2602. In these examples, the rigid battery shell 2600 includes a movable section 2604 that is lighter and easier to move than moving the entire rigid battery shell 2600. In FIG. 26A, the battery pouch 2608 is not swelling and therefore the movable section 2604 remains in a first position. In the depicted example, the first position is flush with a top surface 2610 of the rigid battery shell 2600. In the example of FIG. 26B, the battery pouch 2608 is swelling, which exerts a pressure on the movable section 2604, thereby preferably focusing the swelling pouch's force towards the dome 2602. The swelling may cause the movable section 2604 to move from the first position that is not in contact with the dome to move to a second position that is in contact with the dome. While this example depicts that the first position is where the movable section is flush with a top surface of the rigid battery shell 2600, the first position may locate the movable section so that it is flush with a side surface of the rigid battery shell 2600, above the top surface of the rigid battery shell 2600, below the top surface of the rigid battery shell 2600, next to a surface of the rigid battery shell 2600, at another location, or combinations thereof. In some cases, the movable section 2604 may be formed by creating elastically deformable sections in the rigid battery shell 2600, plastically deformable sections in the rigid battery shell 2600, slidable sections of the rigid battery shell 2600, or combinations thereof.

In the example of FIG. 27, a soft battery pouch 2700 (without a rigid battery shell) is arranged to make direct contact with the dome 2702. In FIG. 28, stiffener 2800 is attached to the dome 2802 that increases the surface area that the pouch 2804 can come into contact with on the dome 2802. This stiffener 2800 may increase the amount of force that a soft sided pouch 2804 may exert on the dome 2802 to get the dome 2802 to depress.

In the example of FIG. 28, the stiffener 2800 is connected to the dome 2802, but in other examples, the stiffener 2800 may be connected to the pouch 2804 of the battery assembly. In such an example where the stiffener is attached to the pouch, the stiffener may be sized to come into contact with a single dome or multiple domes connected to the substrate. Further, in other examples, multiple stiffeners may be connected to the pouch that are aligned with domes and are configured to come into the contact with the domes when the battery swells.

In FIG. 29, a single stiffener 2900 is attached to multiple domes 2902. Such a stiffener 2900 may increase the surface area of the soft pouch 2904 can be push against and thereby concentrating the force from the battery swell towards the domes 2902.

The stiffeners may be made of any appropriate material, including a plastic, a metal, a composite, a ceramic, another type of material, or combinations thereof. In some cases, the stiffener is incorporated into the thickness of the pouch's wall thickness. For example, the cross sectional thickness of the pouch may be increased to form the stiffener or a relatively stiffer material may be inserted into the pouch wall. In some cases, the stiffener may be connected to the outside of the pouch, to the inside of the pouch, to another location, or combinations thereof.

Figure 30:
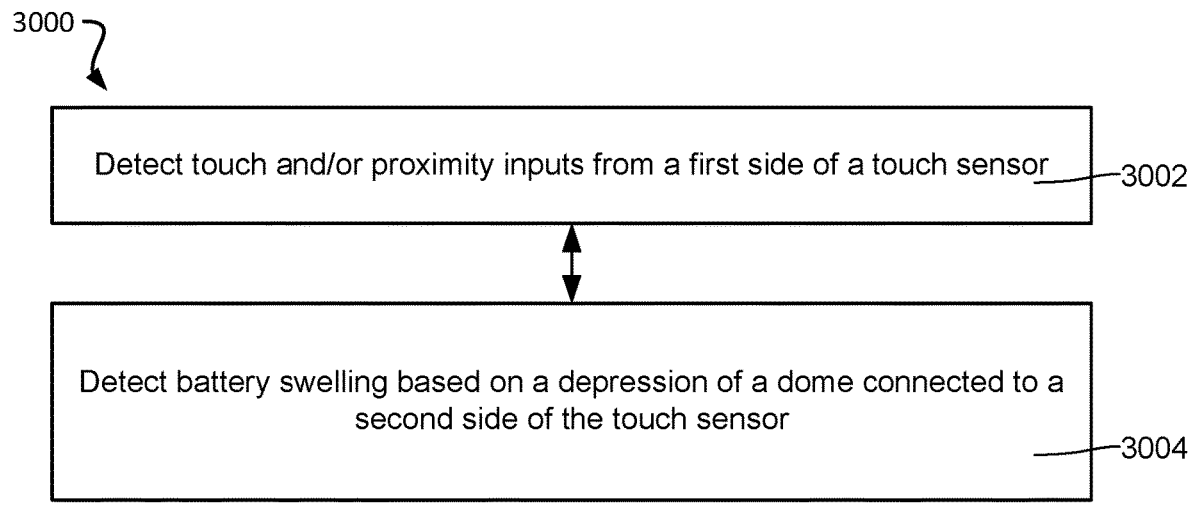
FIG. 30 depicts an example of a battery assembly and a battery swell detection unit in accordance with this disclosure.

FIG. 30 depicts an example of a method 3000 for detecting battery swelling. This method 3000 may be performed based on the description of the devices, modules, and principles described in relation to FIGS. 1-29. In this example, the method 3000 includes detecting 3002 touch and/or proximity inputs from a first side of a touch sensor and detecting 3004 battery swelling based on a depression of a dome connected to a second side of the touch sensor.

Figure 31:
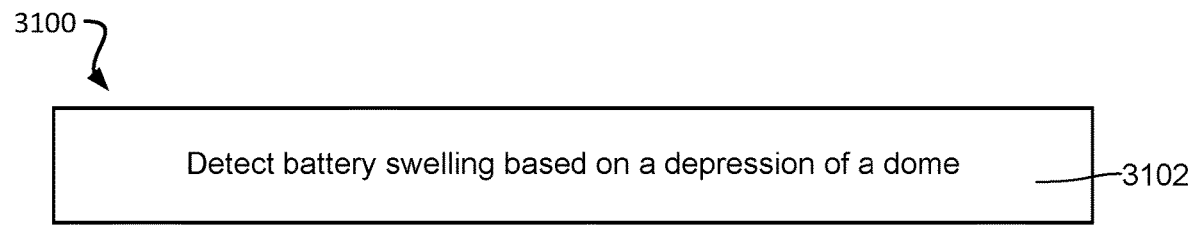
FIG. 31 depicts an example of a method of detecting a battery swell in accordance with this disclosure.

FIG. 31 depicts an example of a method 3100 for detecting battery swelling. This method 3100 may be performed based on the description of the devices, modules, and principles described in relation to FIGS. 1-29. In this example, the method 3100 includes detecting 3102 battery swelling based on a depression of a dome.

Figure 32:
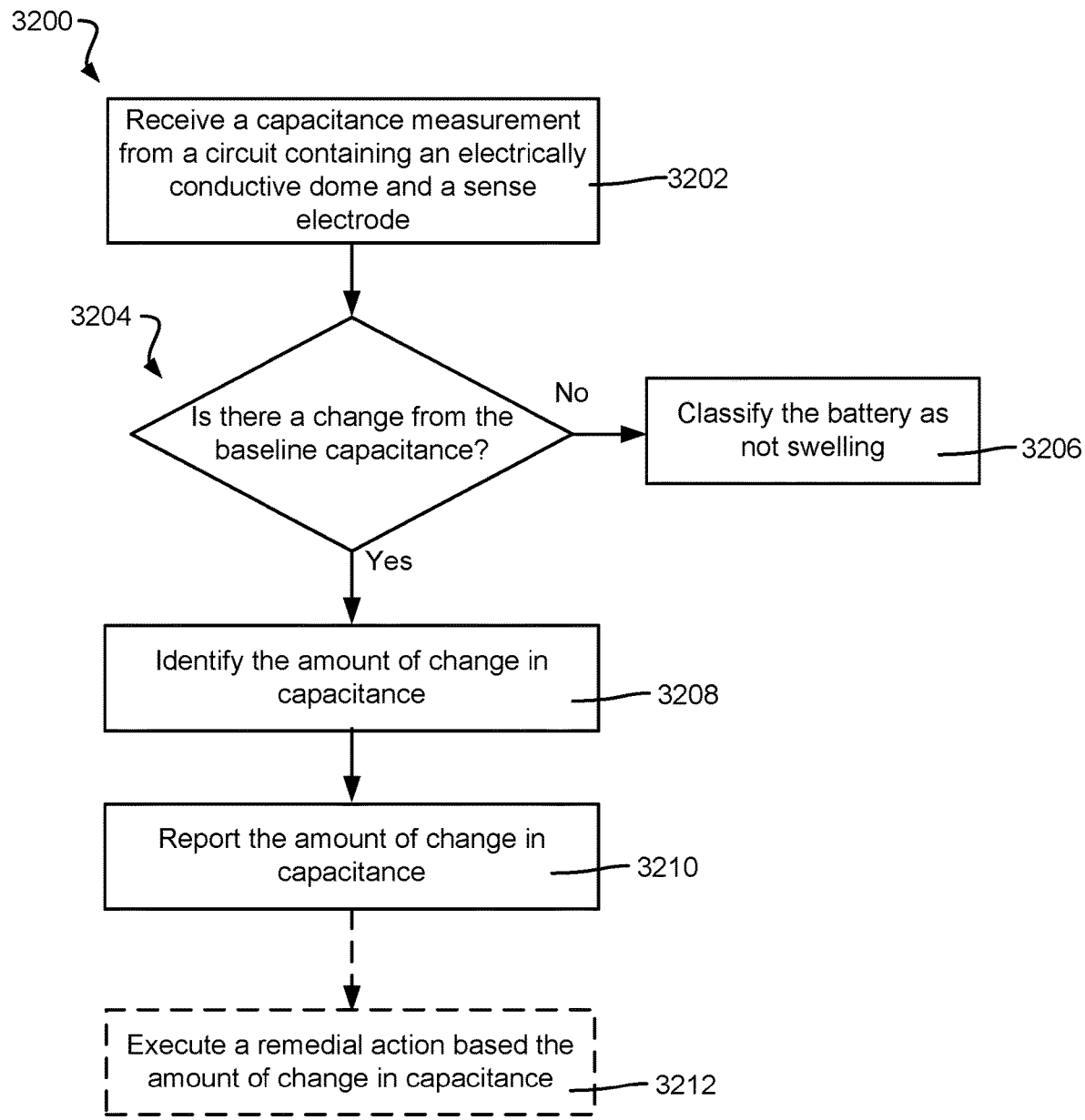
FIG. 32 depicts an example of a method of detecting a battery swell in accordance with this disclosure.

FIG. 32 depicts an example of a method 3200 for detecting battery swelling. This method 3200 may be performed based on the description of the devices, modules, and principles described in relation to FIGS. 1-29. In this example, the method 3200 includes receiving 3202 a capacitance measurement from a circuit containing an electrically conductive dome and a sense electrode and determining 3204 if there is a change from a baseline capacitance. If there is no change from the baseline capacitance, classifying 3206 the battery as not swelling. If there is a change in the baseline capacitance, then identifying 3208 the amount of change in capacitance. The method 3200 further includes reporting 3210 the amount of change in capacitance. Also, the method 3200 may optionally include executing 3212 a remedial action based on the amount of change in capacitance.

Figure 33:
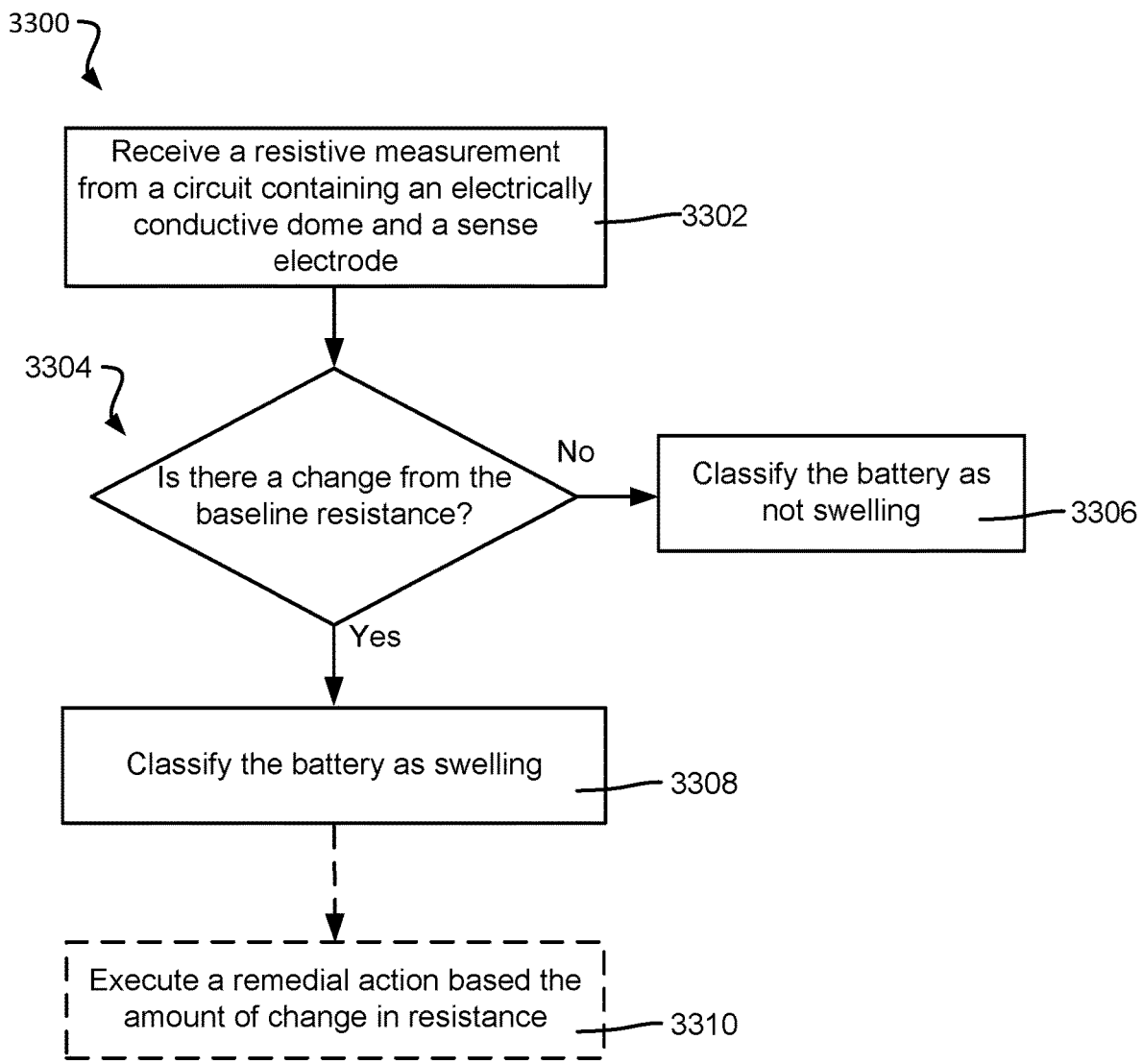
FIG. 33 depicts an example of a method of detecting a battery swell in accordance with this disclosure.

FIG. 33 depicts an example of a method 3300 for detecting battery swelling. This method 3300 may be performed based on the description of the devices, modules, and principles described in relation to FIGS. 1-29. In this example, the method 3300 includes receiving 3302 a resistive measurement from a circuit containing an electrically conductive dome and a sense electrode and determining 3304 if there is a change from a baseline resistance. If there is no change from the baseline resistance, classifying 3306 the battery as not swelling. If there is a change in the baseline resistance, then identifying 3308 the amount of change in resistance. The method 3300 further includes reporting 3310 the amount of change in resistance. Also, the method 3300 may optionally include executing 3312 a remedial action based on the amount of change in resistance.

While the principles above have been described in regards to using a dome, any appropriate mechanism for using the dome to detect battery swell may be used. For example, using a dome as a part of a capacitance sensor, a dome switch, a resistance sensor, an inductive sensor, another type of sensor, or combinations thereof, may be used in accordance with the principles contained in this disclosure. In another type of example, any appropriate type of switch may be used in accordance with the principles disclosed in this disclosure to detect battery swell. For example, a dome switch, a membrane switch, a conductive pill switch, tact switch, another type of switch, or combinations thereof.

In some examples, the switch may include a flex wall around a perimeter of the button. When the battery swells, the flex wall flexes and produces a tactile response (similar to a spring). When the flex wall is fully pressed, the flex wall allows the switch to make contact with a circuit. Conductive pill switches may be made from a silicone conductive material that contains carbon or another appropriate material. When the conductive pill makes contact with the circuit, it may complete the circuit on a printed circuit board or flexible circuit trace. Conductive pills may be silicone based and may have a round shape, oval shape, rectangular shape, another type of shape, or combinations thereof. In some cases, multiple switch and various different types of switches may be used to detect the battery swell. In examples, a membrane switch may include a dielectric layer sandwiched between a first conductive layer and a second conductive layer. The dielectric layer may define an opening creating a void between the first and second conductive layers. When the battery swells, either the first conductive layer, the second conductive layer, or both, may be pushed into the void so that the first conductive layer and the second conductive layer come into contact with each other.

Figure 34:
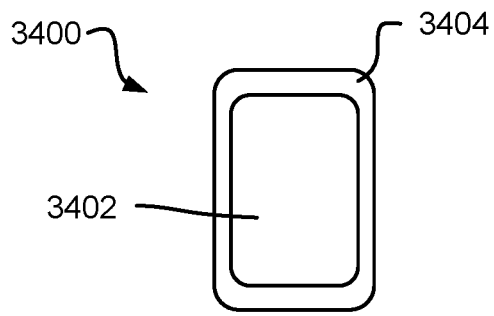
FIG. 34 depicts an example of a membrane switch in accordance with this disclosure.

FIG. 34 depicts an example of a membrane switch 3400. In some examples, the membrane switch 3400 includes a more structurally ridged frame 3404 to which a more flexible membrane 3402 is attached. The flexible membrane 3402 may be made of an electrically conductive material. In some cases, the membrane 3402 may be moved towards a gap in a circuit and complete the circuit when the membrane bridges portions of the circuit that were previously disconnected to each other. Also, the membrane 3402 may be moved away from the circuit's gap thereby breaking the circuit when the movement of the membrane away from the gap electrically disconnects the portions of the circuit that were previously electrically connected through the membrane. In some cases, the membrane 3402 may move towards a circuit or away from a circuit when a force is applied to the membrane, such as when a battery swells.

Figure 35:
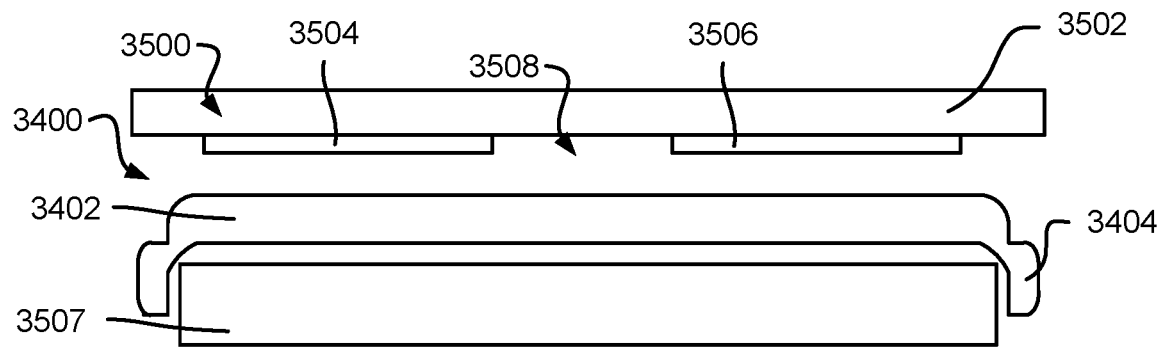
FIG. 35 depicts an example of a membrane switch in a position that allows a circuit to be open in accordance with this disclosure.

FIG. 35 depicts an example of a membrane switch 3400 positioned between a battery assembly 3507 and a touch sensor 3502, such as a touch sensor that is incorporated into a laptop or another type of computing device. The touch sensor 3502 may include a substrate, such as a printed circuit board. The top layers of the touch sensor 3502 may be used to sense the position of a user's hand or the position of another object near the touch sensor 3502. The underside of the touch sensor 3502 may include a circuit 3500 used to detect battery swell.

Figure 36:
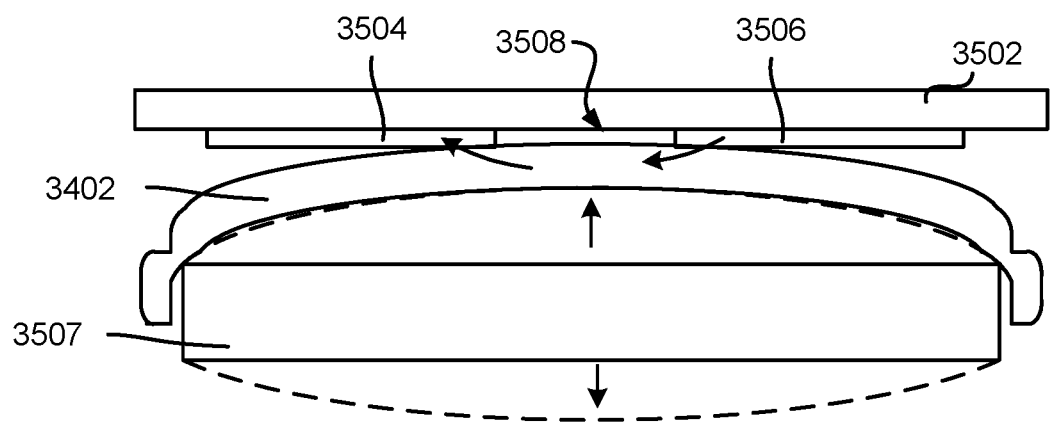
FIG. 36 depicts an example of a membrane switch in a position that closes a circuit in accordance with this disclosure.

The circuit 3500 may include a first circuit portion 3504 and a second circuit portion 3506. When the battery is not in a swollen condition, the membrane 3402 of the membrane switch 3400 may remain unmoved, and the first and second portions 3504, 3506 of the circuit 3500 may be electrically isolated from each other. However, when the battery is in a swollen condition, as depicted in FIG. 36, the membrane 3402 may be moved towards the gap 3508 between the first and second portions 3504, 3506 of the circuit 3500. When the membrane 3402 moves into a position that contacts both the first and second portions 3504, 3506 of the circuit 3500, the membrane bridges the gap 3508 and complete the circuit 3500. With the circuit 3500 complete, electricity may flow through the circuit 3500, and the detection of electricity flowing through the circuit 3500 may indicate a swollen battery.

Figure 37:
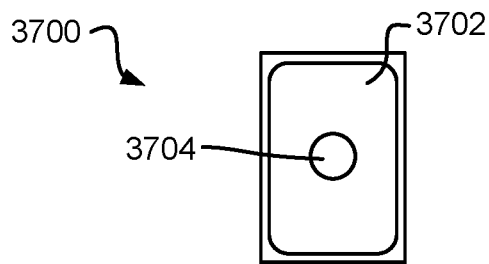
FIG. 37 depicts an example of a conductive pill switch in accordance with this disclosure.

FIG. 37 depicts an example of a conductive pill switch 3700. In this example, the conductive pill switch 3700 includes a movable body 3702 and an electrically conductive pill 3704 on the movable body 3702.

Figure 38:
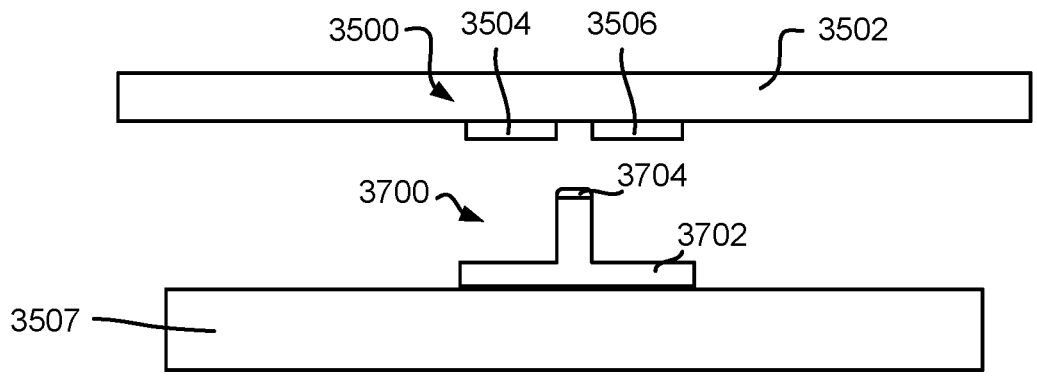
FIG. 38 depicts an example of a conductive pill switch in a position that allows a circuit to be open in accordance with this disclosure.
Figure 39:
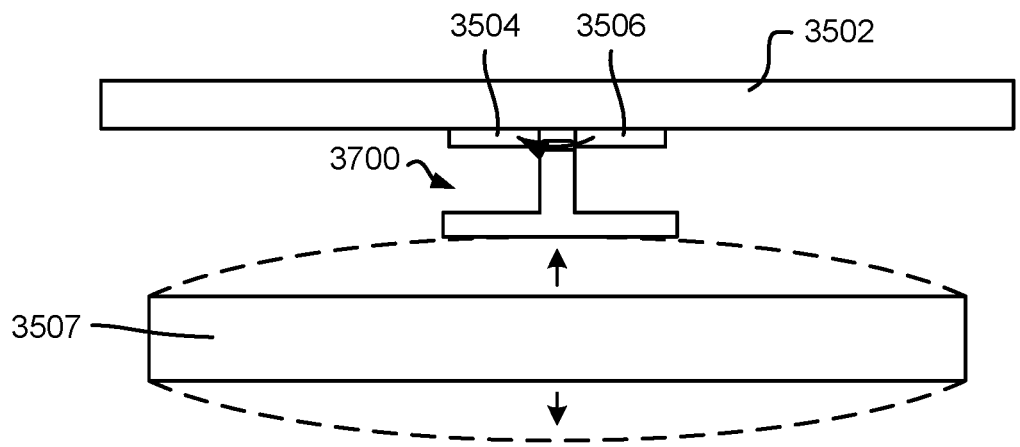
FIG. 39 depicts an example of a conductive pill switch in a position that closes a circuit in accordance with this disclosure.

FIG. 38 depicts a conductive pill switch 3700 positioned between a battery 3507 and a touch sensor 3502. In this example, a first circuit portion 3504 and a second circuit portion 3506 are attached to the underside of the touch sensor 3502. In this example, the circuit 3500 is open with a gap 3508 between the first circuit portion 3504 and a second circuit portion 3506. However, as depicted in FIG. 39, when the battery is swollen, the body 3702 of the conductive pill switch 3700 is moved towards the circuit 3500. The electrically conductive pill 3704 is moved into a position that contacts both portions 3504, 3506 of the circuit 3500 thereby completing the circuit 3500. With the circuit 3500 complete, the resulting flow of electricity may be detected thereby determining that there is battery swelling.

Figure 40:
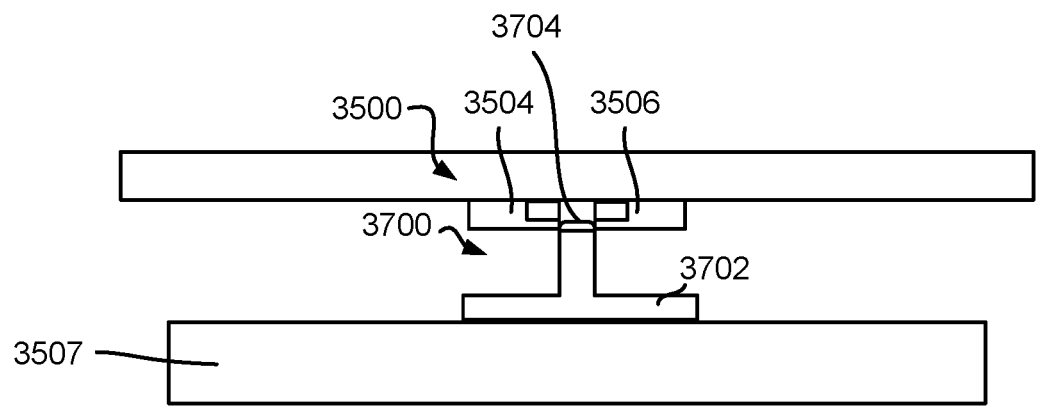
FIG. 40 depicts an example of a conductive pill switch in a position that completes a circuit in accordance with this disclosure.
Figure 41:
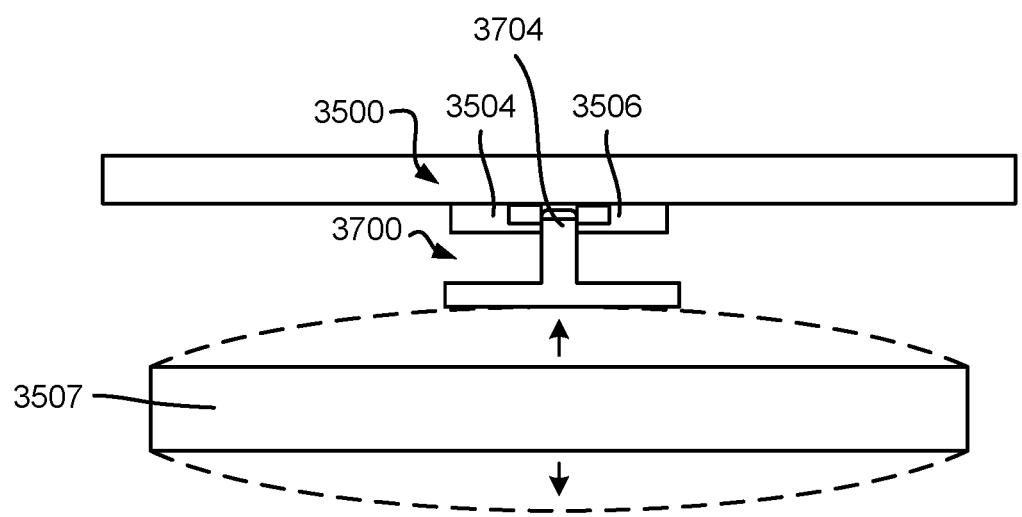
FIG. 41 depicts an example of a conductive pill switch in a position that opens a circuit in accordance with this disclosure.

FIGS. 40 and 41 depict an example of conductive pull switch 3700. In these examples, when the battery 3507 is not swollen, as depicted in FIG. 40, the electrically conductive pill 3704 is positioned to be in contact with both the first and second portions 3504, 3506 of the circuit 3500. In this example, electricity may capable of flowing through the circuit 3500 under conditions where there is little to no battery swelling. Thus, the ability for electricity to be able to flow through the circuit 3500 may indicate that there is little to no battery swelling. On the other hand, as depicted in FIG. 41, when there is battery swelling, the pressure from the battery swelling may cause the movable body 3702 to move, thereby moving the electrically conductive pill 3704 to move away from being in contact with at least one of the first or second portions 3504, 3506 of the circuit 3500 thereby breaking the circuit 3500. Thus, in this type of example, the inability of electricity to flow through the circuit 3500 may indicate that there is battery swelling.

Figure 42:
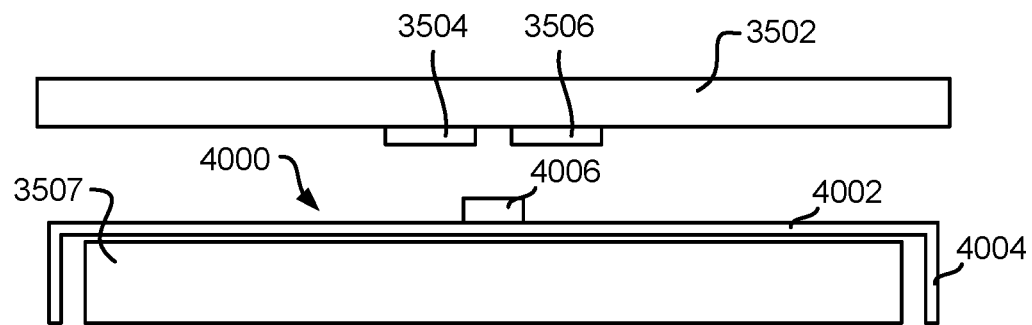
FIG. 42 depicts an example of a switch incorporated on an exterior surface of a rigid casing adjacent to a battery in accordance with this disclosure.
Figure 43:
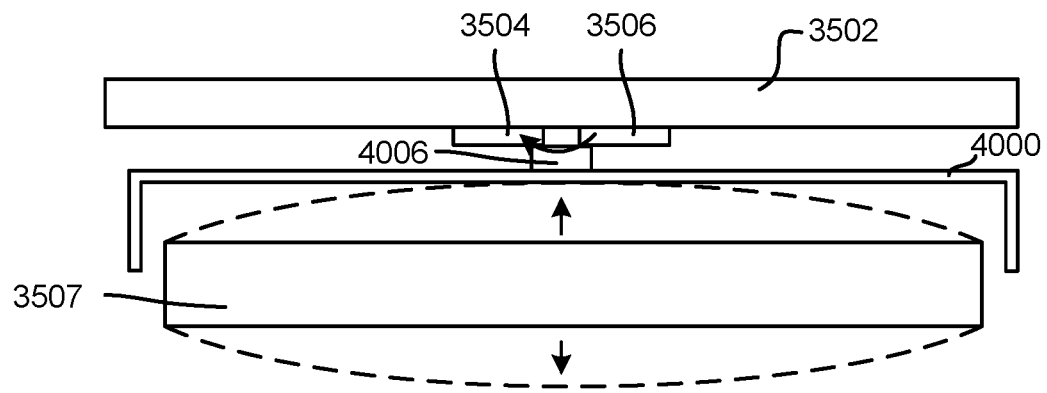
FIG. 43 depicts an example of a switch incorporated on an exterior surface of a rigid casing adjacent to a battery in accordance with this disclosure.

FIG. 42 depicts an example of a touch sensor 3502 with unconnected first and second portions 3504, 3506 of a circuit 3500 formed thereon. In this example, the battery assembly 3507 includes a rigid casing 4000 that surrounds at least a portion of the battery. In this example, the rigid casing 4000 includes a rigid surface 4002 between the touch sensor 3502 and the battery 3507 and also side walls 4004 that are positioned proximate the battery 3507. However, in this particular example, the side walls 4004 are connected by the rigid surface 4002 on one side while the underside of the rigid casing 4000 remains open and defines an internal cavity. In this example, the battery is disposed within the internal cavity of the rigid battery casing 4000. An electrically conductive contact 4006 is attached to the rigid casing 4000, and is therefore movable with movement of the rigid casing 4000. In the example depicted in FIG. 42, the circuit 3500 is open. However, in the example depicted in FIG. 43, the battery is swollen and depicts that the rigid casing 4000 has been pushed towards the touch sensor 3502 until the electrically conductive contact 4006 connects the first and second portions 3504, 3506 of the circuit 3500. In alternative examples, a portion of the rigid casing or the entire rigid casing may be made of an electrically conductive material that is capable of connecting the first and second portions 3504, 3506 of the circuit when the rigid battery casing is moved into contact with underside of the touch sensor 3502.

Figure 44:
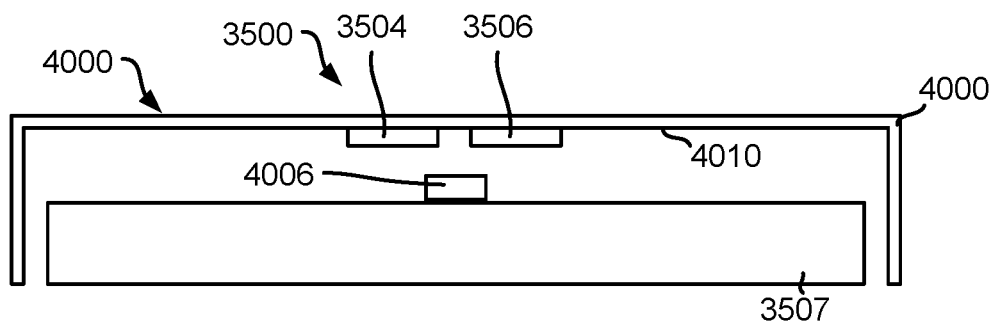
FIG. 44 depicts an example of a switch incorporated on an interior surface of a rigid casing adjacent to a battery in accordance with this disclosure.
Figure 45:
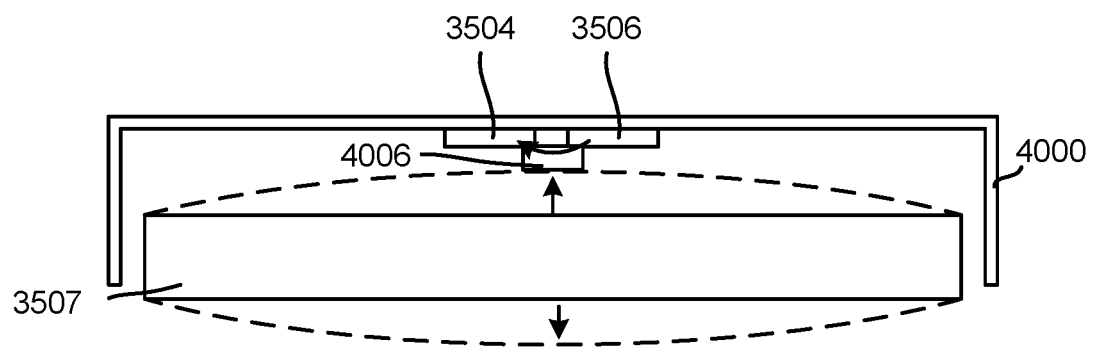
FIG. 45 depicts an example of a switch incorporated on an interior surface of a rigid casing adjacent to a battery in accordance with this disclosure.

FIG. 44 depicts an example of the circuit 3500 formed on an interior surface 4010 of the rigid battery casing 4000. An electrically conductive contact 4006 is attached to the battery 3507. In the example of FIG. 44, the battery is not in a swollen state, and the circuit 3500 is open. However, in the example depicted in FIG. 45, the battery 3507 is swollen causing the electrically conductive contact 4006 to move towards the interior surface 4010 of the rigid battery casing 4000 to complete the circuit 3500.

Figure 46:
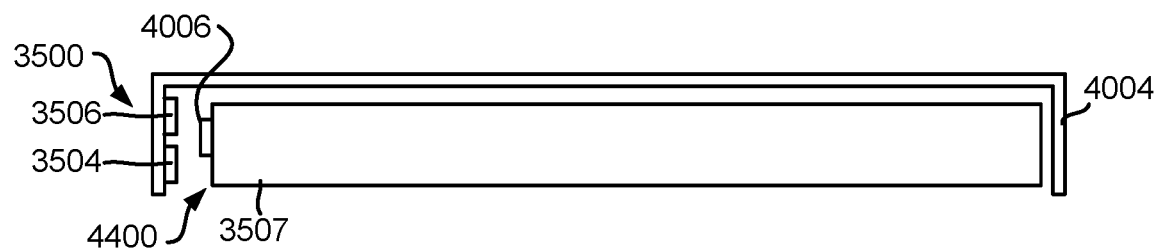
FIG. 46 depicts an example of a switch incorporated on an interior surface of a rigid casing adjacent to a battery in accordance with this disclosure.
Figure 47:
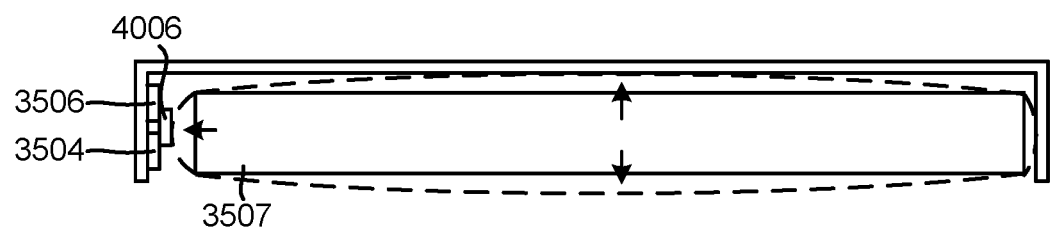
FIG. 47 depicts an example of a switch incorporated on an interior surface of a rigid casing adjacent to a battery in accordance with this disclosure.

FIGS. 46 and 47 depict an example with the electrical contact 4006 attached to a side 4400 of the battery 3507. The circuit 3500 may be incorporated into a side wall 4004 of the rigid battery casing 4000. In the example of FIG. 46, the battery 3507 is not in a swollen condition and the circuit 3500 remains open. In the example depicted in FIG. 47, the battery exhibits sufficient swelling to cause the electrically conductive contact 4006 to move towards and to complete the circuit 3500.

Figure 48:
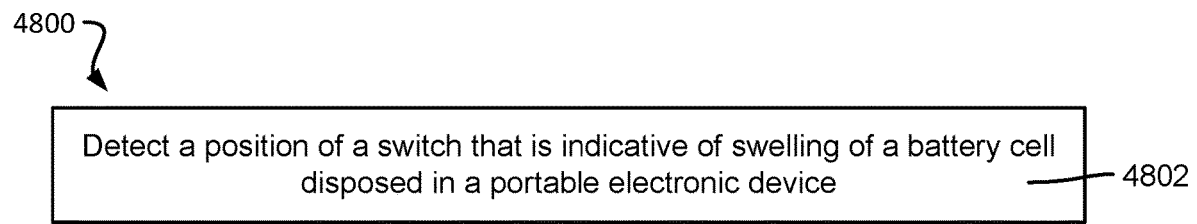
FIG. 48 depicts an example of a method of detecting a battery swell in accordance with this disclosure.

FIG. 48 depicts an example of a method 4800 for detecting battery swelling. This method 4800 may be performed based on the description of the devices, modules, and principles described in relation to FIGS. 1-47. In this example, the method 4800 includes detecting 4802 a position of a switch that is indicative of swelling of a battery cell disposed in a portable electronic device.

It should be noted that the methods, systems and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

The invention claimed is:
1. A portable electronic device, comprising:
  a battery assembly;
  a battery swell detection unit in proximity to the battery assembly, the battery swell detection unit includes:
    a circuit;
    a switch positioned to be moved by swelling of a battery cell;
  a touch sensor;
  a processor; and
  memory having programmed instructions that cause the processor, when executed, to:

detect battery swelling based on a position of the switch;

wherein the switch is a conductive pill switch positioned between the battery and the touch sensor.

2. The portable electronic device of claim 1, wherein swelling of the battery cell causes the switch to move to complete the circuit.

3. The portable electronic device of claim 1, wherein swelling of the battery cell causes the switch to move to open the circuit.

4. The portable electronic device of claim 1, further comprising:

the touch sensor including:
- a touch surface integrated onto an input surface of the portable electronic device;
- a printed circuit board located between the input surface and the battery assembly; and
- the printed circuit board including a touch side facing towards the touch surface and a battery side facing towards the battery assembly;

wherein the switch is connected to the battery side of the printed circuit board.

5. The portable electronic device of claim 1, wherein the circuit and switch are incorporated into a casing surrounding the battery cell of the battery assembly.

6. The portable electronic device of claim 1, wherein the switch is configured to move with a casing surrounding the battery cell of the battery assembly.

7. The portable electronic device of claim 1, wherein the conductive pill switch includes a silicone conductive material.

8. The portable electronic device of claim 1, wherein a first portion of the circuit and a second portion of the circuit are attached to the underside of the touch sensor.

9. The portable electronic device of claim 8, wherein a gap is between the first portion of the circuit and the second portion of the circuit when the battery cell is not swollen.

10. The portable electronic device of claim 9, wherein the conductive pill switch is moved into the gap when the battery cell is swollen and contacts both the first portion of the circuit and the second portion of the circuit.

11. The portable electronic device of claim 1, wherein when the battery cell is swollen pressure from the battery cell may cause the conductive pill switch to break the circuit.

12. The portable electronic device of claim 1, wherein detecting battery swelling includes determining a battery swell when electricity is flowing on the circuit.

13. The portable electronic device of claim 1, wherein detecting battery swelling includes determining a battery swell when electricity is not flowing on the circuit.

* * * * *